(12) United States Patent
Echevarria Vallespi et al.

(10) Patent No.: US 11,651,530 B2
(45) Date of Patent: May 16, 2023

(54) MODIFICATION OF COLOR CONTRAST RATIO BASED ON TARGET CONTRAST

(71) Applicant: Adobe Inc., San Jose, CA (US)

(72) Inventors: Jose Ignacio Echevarria Vallespi, Belmont, CA (US); Manisha Gupta, Bangalore (IN); Bernard James Kerr, Sausalito, CA (US)

(73) Assignee: Adobe Inc., San Jose, CA (US)

( * ) Notice: Subject to any disclaimer, the term of this patent is extended or adjusted under 35 U.S.C. 154(b) by 15 days.

(21) Appl. No.: 17/354,611

(22) Filed: Jun. 22, 2021

(65) Prior Publication Data

US 2022/0405988 A1  Dec. 22, 2022

(51) Int. Cl.
*G06T 11/00* (2006.01)
*G06F 3/0482* (2013.01)

(52) U.S. Cl.
CPC ......... *G06T 11/001* (2013.01); *G06F 3/0482* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,754,184 A | * | 5/1998 | Ring | G06T 11/001 345/604 |
| 7,184,063 B2 | * | 2/2007 | Shum | G06T 11/001 345/640 |
| 8,264,499 B1 | * | 9/2012 | Landry | H04N 9/76 715/275 |
| 10,319,116 B1 | * | 6/2019 | C | G09G 5/377 |
| 11,386,590 B1 | | 7/2022 | Bonfiglio et al. | |
| 2002/0186222 A1 | * | 12/2002 | Morton | G06F 9/451 345/589 |
| 2011/0074807 A1 | * | 3/2011 | Inada | G06T 11/001 345/589 |
| 2018/0357231 A1 | | 12/2018 | Kraft et al. | |
| 2022/0335662 A1 | | 10/2022 | Echevarria Vallesp | |

OTHER PUBLICATIONS

Maureen C. Stone; "Representing Colors as Three Numbers;" Published by the IEEE Computer Society; Jul./Aug. 2005; pp. 78-85 (Year: 2005).*

(Continued)

*Primary Examiner* — Edward Martello
(74) *Attorney, Agent, or Firm* — FIG. 1 Patents

(57) ABSTRACT

Techniques are described for modification of color contrast ratio based on target contrast that overcome the challenges experienced in conventional systems for color contrast selection. In an implementation, a user leverages a content editing system to select a color set for contrast analysis. Utilizing the selected color set, the content editing system determines whether the color set exhibits a target contrast ratio. Further, the content editing system performs modification of the color set to generate candidate color sets that improve (e.g., increase) a contrast ratio of the original color set. The content editing system, for instance, manipulates color values (e.g., luminance values) of the original color set to increase a contrast ratio of the colors and generate different candidate color sets that are applicable to digital content.

20 Claims, 27 Drawing Sheets
(20 of 27 Drawing Sheet(s) Filed in Color)

(56) References Cited

OTHER PUBLICATIONS

"CIE 1931 color space", Wikipedia, The Free Encyclopedia [retrieved Apr. 13, 2021]. Retrieved from the Internet <https://en.wikipedia.org/wiki/CIE_1931_color_space>., 16 pages.
"Color Wheel—A Color Palette Generator", Adobe Inc., Adobe Color [online][retrieved May 5, 2021]. Retrieved from the Internet <https://color.adobe.com/create/color-wheel>., 2 pages.
"Contrast (Minimum): Understanding SC 1.4.3", W3C Working Group Note, Understanding WCAG 2.0 [retrieved Apr. 13, 2021]. Retrieved from the Internet <https://www.w3.org/TR/UNDERSTANDING-WCAG20/visual-audio-contrast-contrast.html#contrast-ratiodef>., 2016, 7 pages.
"Contrast Checker", Web AIM Website [retrieved Apr. 13, 2021]. Retrieved from the Internet <https://webaim.org/resources/contrastchecker/>., 2 pages.
"Introducing Stark Smart Suggestions", Uploaded by Stark [retrieved Apr. 13, 2021]. Retrieved from the Internet <https://www.youtube.com/watch?v=lqVJeXjpCXk>., Sep. 15, 2020, 3 pages.
U.S. Appl. No. 17/235,067 , "Non-Final Office Action", U.S. Appl. No. 17/235,067, filed Dec. 21, 2022, 75 pages.
Adobe, Inc., "Adobe Photoshop 6.0", Adobe Systems Incorporated [retrieved Dec. 26, 2022]. Retrieved from the Internet <http://kfrserver.natur.cuni.cz/obecne/soubory/PhotoShop6/UserGuide.pdf>, 2000, 448 pages.
Hogue, J., "Evaluate Your Company Brand Color Palette for Accessibility", Oomph, Inc. Blog [online][retrieved Dec. 26, 2022]. Retrieved from the Internet <https://www.oomphinc.com/inside-oomph/evaluate-brand-colors-for-accessibility/>, Nov. 20, 2019, 14 pages.
Randommomentania , "Godot Color Mask Tutorial", Random-Momentania Blog [online][retrieved Dec. 26, 2022]. Retrieved from the Internet <https://randommomentania.com/2019/07/godot-color-mask-tutorial/>, Jul. 13, 2019, 16 pages.
Vinkle, Scott , "Testing Color Design for Accessibility", Scott Vinkle Blog [Online][retrieved Dec. 26, 2022], Retrieved from the Internet <https://scottvinkle.me/blogs/work/color-contrast>, Nov. 13, 2018, 7 pages.
Walter, Stéphanie , et al., "Tips to Create an Accessible and Contrasted Color Palette", Stephanie Walter Blog [online][retrieved Dec. 26, 2022]. Retrieved from the Internet <https://stephaniewalter.design/blog/tips-create-accessible-color-palette/>, Mar. 3, 2019, 23 pages.
U.S. Appl. No. 17/235,067, "Final Office Action", U.S. Appl. No. 17/235,067, dated Mar. 24, 2023, 95 pages.
Malhotra, Anuj , "Color Wheel Basics: How To Choose the Right Color Scheme for your PowerPoint Slides", The Slideteam Blog [retrieved Mar. 24, 2023]. Retrieved from the Internet <https://www.slideteam.net/blog/color-wheel-choose-right-color-scheme-powerpoint-slides>, Sep. 10, 2015, 35 pages.

* cited by examiner

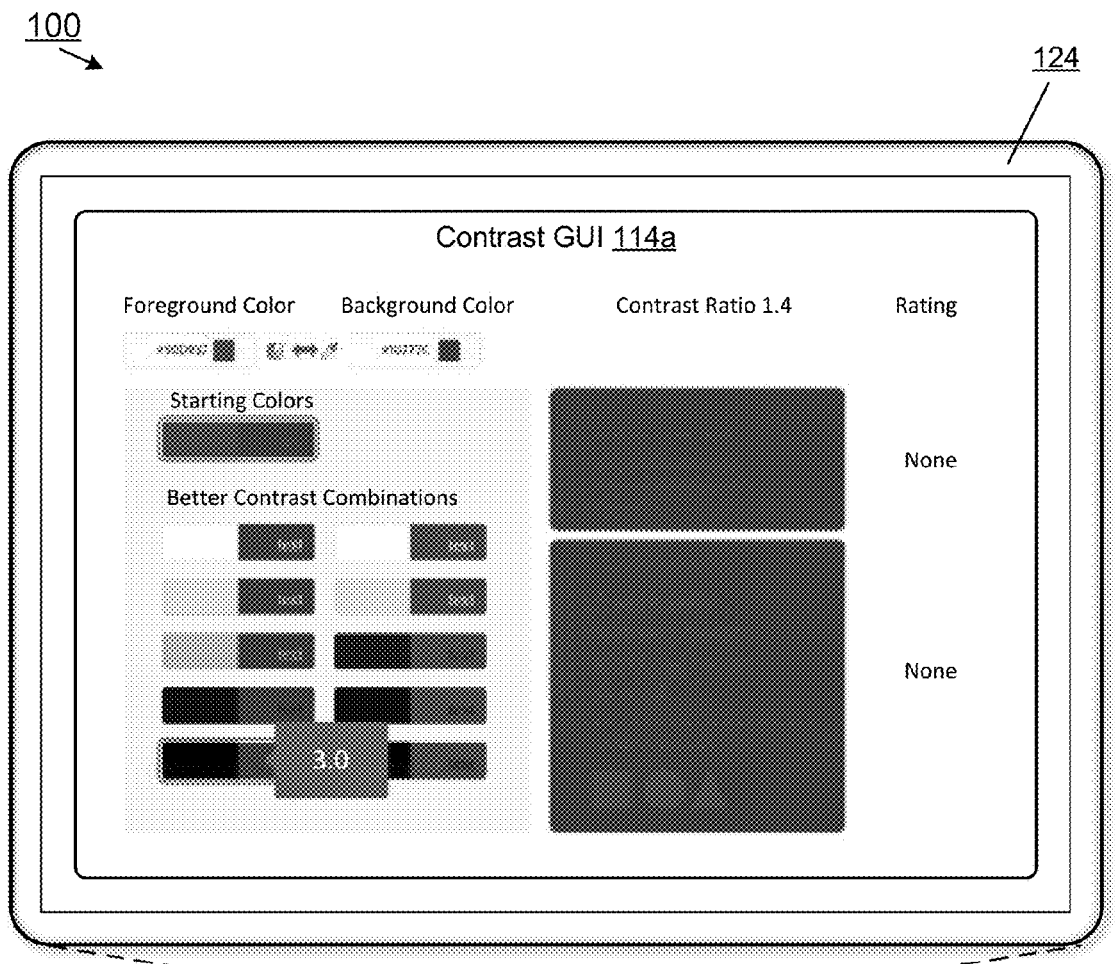
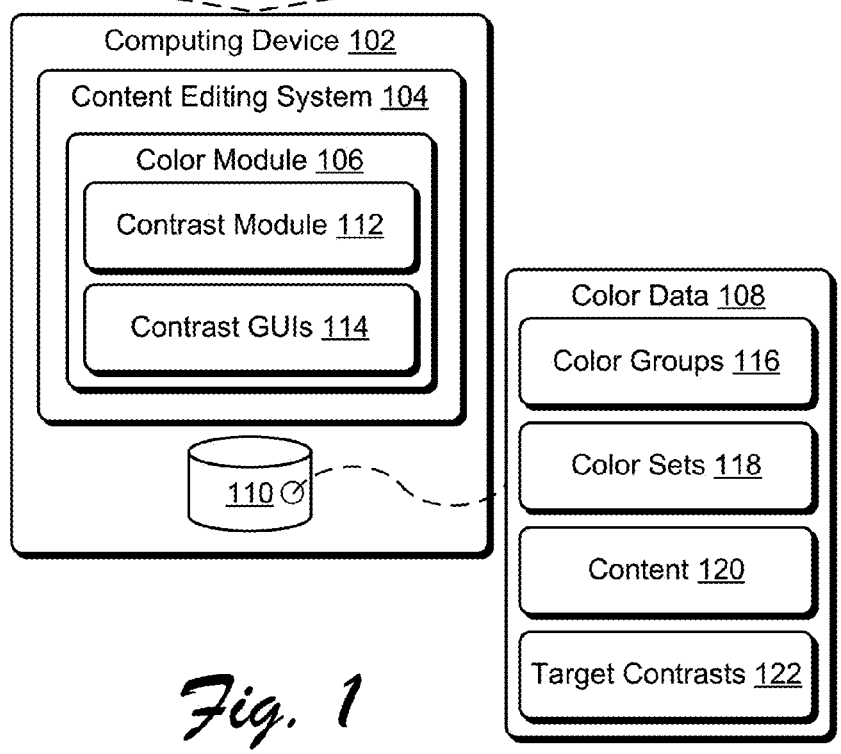
Fig. 1

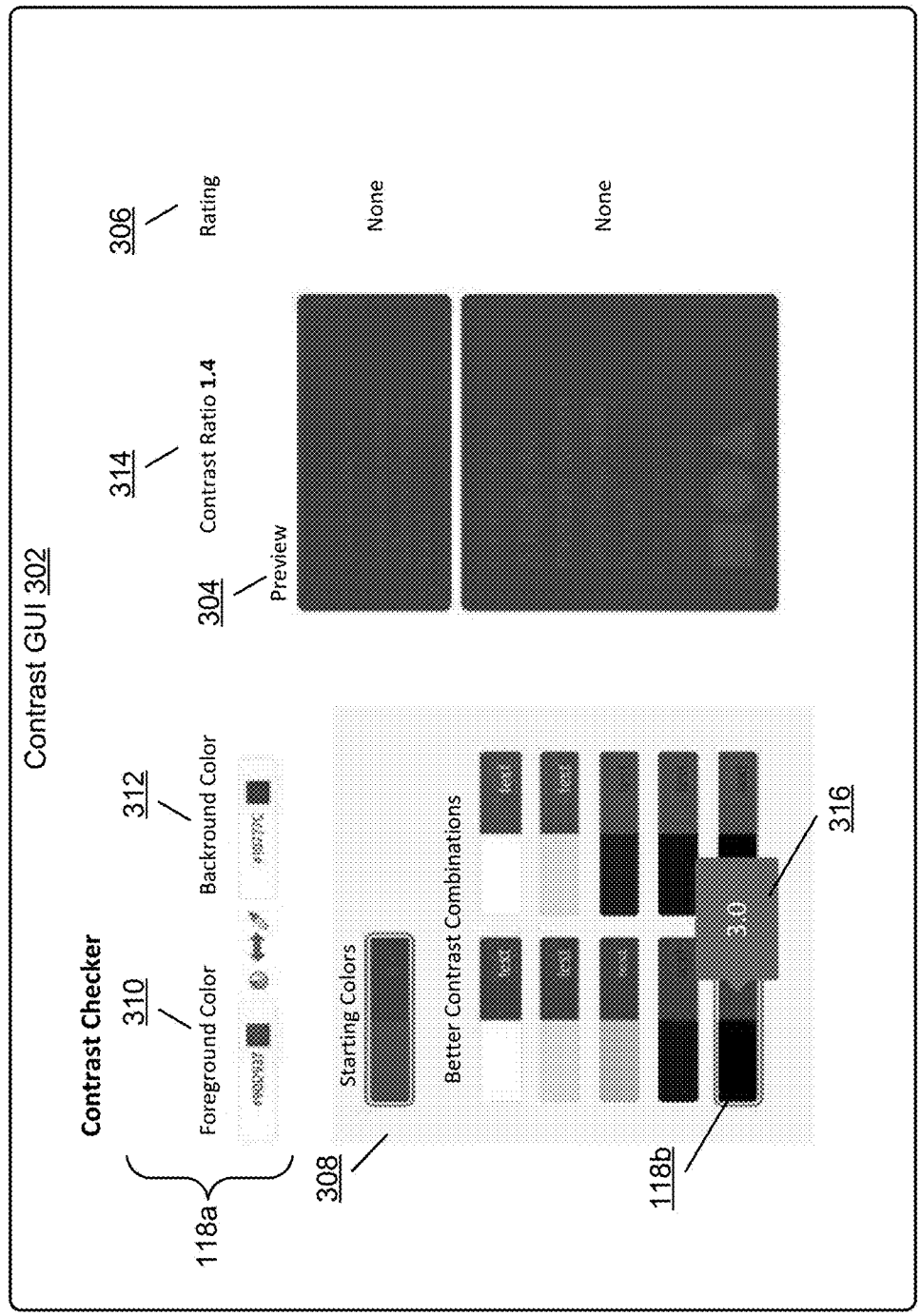

US 11,651,530 B2

MODIFICATION OF COLOR CONTRAST RATIO BASED ON TARGET CONTRAST

BACKGROUND

One of the most powerful tools in a digital designer's arsenal is color and based on color's profound effect on a viewer's perception of visual elements, color plays a significant role in design. Further, various color properties contribute to the visual appearance of color, such as hue, saturation, and brightness. When considering multiple colors together in a visual image, color contrast is particularly important in enabling a user to visually distinguish different colored objects from one another, such as when designing visuals for persons with vision impairments who are determined to have difficulty discerning differences between similar colors. To assist web designers in generating web content that accommodates individuals with vision impairments, the Web Accessibility Initiative (WAI) initiated by the World Wide Web Consortium (W3C) has generated Web Content Accessibility Guidelines (WCAG) for visual web content. The WCAG, for instance, provide accessibility standards that specify that colors of touching visual elements (e.g., text over background) are to have particular target contrast ratios to be visible for people with vision impairments.

Generally, contrast ratio between two colors is determined based on the colors' relative luminance values. However, conventional systems for selecting colors are designed to enable selection of a single color and enable limited controls for navigating the corresponding color gamut geometry, but do not provide direct control over relative luminance values. Consequently, selection of color sets that meet target contrast ratios using conventional color systems requires cumbersome trial and error, as each of the limited controls affects relative luminance in a different manner. Thus, conventional systems require a great deal of manual user interaction to select colors and thus are prone to errors in selecting colors that meet target contrast ratios.

SUMMARY

Techniques are described for modification of color contrast ratio based on target contrast that overcome the challenges experienced in conventional systems for color contrast selection. In an implementation, a user leverages a content editing system to select a color set for contrast analysis. Utilizing the selected color set, the content editing system determines whether the color set exhibits a target contrast ratio. Further, the content editing system performs modification of the color set to generate candidate color sets that improve (e.g., increase) a contrast ratio of the original color set. The content editing system, for instance, manipulates color values (e.g., luminance values) of the original color set to increase a contrast ratio of the colors and generate different candidate color sets that are applicable to digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ modification of color contrast ratio based on target contrast techniques described herein.

FIG. 3 depicts an example implementation scenario for checking contrast values for different color combinations.

DETAILED DESCRIPTION

Overview

Figure 2A:
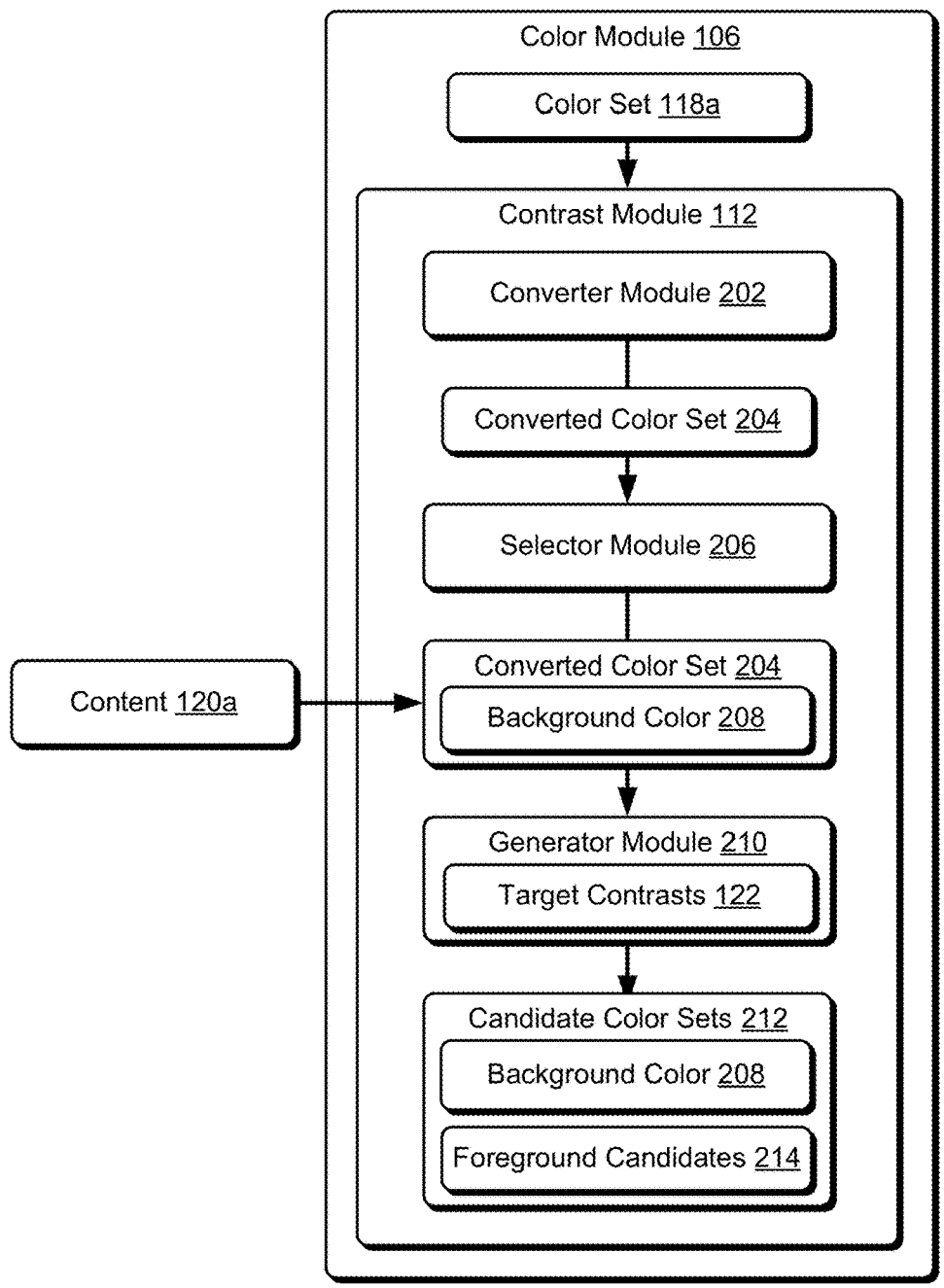
FIG. 2a depict aspects of an example system for performing modification of color contrast ratio based on target contrast.

Color sets provide digital designers with selections of colors for design tasks, such as part of generating and/or editing digital visual content. When utilizing a color set for digital content it is important to consider color contrast between different colors of a color set such as to enable foreground content of one color to be visually distinguished from a background of another color. Contrast is particularly important to consider when designing visuals for persons with vision impairments who are determined to have difficulty discerning differences between similar colors. Conventional techniques for identifying appropriate color contrast values, however, exhibit a number of drawbacks. For instance, conventional techniques typically provide designers with the ability to check contrast of existing sets of colors and provide suggestions for other color sets that are coarsely selected without consideration of a designer's original color scheme. Accordingly, designers are often required to manually search and manipulate volumes of colors to attempt to obtain colors that achieve a suitable contrast ratio. Thus, conventional techniques are labor intensive and prone to inaccuracies in color selection and thus result in inefficient use of system resources.

Accordingly, techniques are described for modification of color contrast ratio based on target contrast that overcome the challenges experienced in conventional systems for color contrast selection. In an implementation, a user leverages a content editing system to select a color set for contrast analysis. Utilizing the selected color set, the content editing system determines whether the color set exhibits a target contrast ratio, such as based on contrast ratios defined by the WCAG standards. Further, the content editing system performs modification of the color set to generate candidate color sets that improve (e.g., increase) a contrast ratio of the original color set. The content editing system, for instance, manipulates color values (e.g., luminance values) of the original color set to increase a contrast ratio of the colors and generate different candidate color sets that are applicable to digital content.

In at least one implementation, to enable precise control over contrast values of a color set, the described content editing system converts a selected color set from an input color space to a second color space. For instance, typical computing systems utilize RGB color spaces that are able to be output by typical display technology. Accordingly, the techniques described herein convert an input color set in an RGB color space into a CIE 1931 color space, such as the CIE xyY color space to generate a converted color set. Color values of the converted color set (e.g., Y values) are manipulated to generate candidate color sets that exhibit improved contrast ratio values, e.g., within target contrast ratio range. A user is then able to select a desired candidate color set to be applied to digital content to enable the digital content to comply with specified range of target contrast ratios.

Accordingly, the techniques described herein overcome challenges to color contrast ratio adjustment presented in conventional systems. For instance, by incrementally adjusting color values of an input color set to improve contrast ratio, the described techniques generate color sets that closely correlate with original color sets that represent a designer's color scheme. Generally, this represents in increase in efficiency over conventional systems since a user need not manually manipulate colors to identify color sets that correspond to desired color scheme. Among other improvements, this reduces the burden on system resources (e.g., processors, memory, network bandwidth, and so forth) that are allocated to contrast ratio adjustment tasks.

Term Definitions

These term definitions are provided for purposes of example only and are not intended to be construed as limiting on the scope of the claims.

As used herein, the term "contrast ratio" refers to a difference in brightness (e.g., luminance) between colors of a set of colors. For instance, contrast ratio values are determined by comparing luminance values of foreground content and background content of a set of content in a particular color set. In at least one implementation the higher a contrast ratio the more distinguishable are visual objects of digital content.

As used herein, the term "color gamut" refers to a range of colors in a color space, such as colors visible to the human eye. As used herein, the term "color space" refers to one or more standards that define color gamut constraints relative to display devices, and include color space definitions such as RGB (e.g., sRGB), HSL, HSV, CMYK, LAB, CIE 1931 (e.g., CIE XYZ, CIE xyY), and so forth.

The "RGB" color space specifies a color value with red, green, and blue (red, green, blue) parameters. Each parameter defines the intensity of the corresponding color as an integer between zero and 255. For example, RGB (0, 0, 255) is rendered as blue, because the blue parameter is set to its highest possible value while the red and green parameters are set to zero.

The "1931 CIE" color space refers to a mapping of colors resulting from experiments conducted to identify colors visible to an average human, and includes color space definitions such as CIE XYZ and CIE xyY. For instance, a 1931 CIE color space represents a color value in terms of a three-axis system, where the Y-axis corresponds to relative luminance and the Y parameter specifies a position on the Y-axis. The X and Z axes represent how cones in the human eye respond to light waves of varying frequencies, quantified in terms of tristimulus values, and thus the XYZ color space provides a device-invariant representation of color. Because the human eye has three types of color sensors that respond to different ranges of wavelengths, plotting the XYZ color space results in a three-dimensional color gamut geometry. The "xyY" color space refers to a transformation of the XYZ color space to two-dimensional coordinates, where the "x" and "y" parameters specify the chromaticity of a color and the "Y" parameter specifies the relative luminance of the color. Via the mapping provided by the xyY color space, the X and Z tristimulus values in the XYZ color space are able to be calculated back from the chromaticity values and the relative luminance value.

In the following discussion, an example environment is described that employs the techniques described herein. Example systems, implementation scenarios, and procedures are also described which are performable in the example environment as well as other environments. Generally, performance of the example procedures is not limited to the example environment and the example environment is not limited to performance of the example procedures.

Example Environment

FIG. 1 is an illustration of a digital medium environment 100 in an example implementation that is operable to employ modification of color contrast ratio based on target contrast techniques described herein. The illustrated environment 100 includes a computing device 102 which is configurable in a variety of ways. The computing device 102, for instance, is configurable as a desktop computer, a laptop computer, a mobile device (e.g., assuming a handheld configuration such as a tablet or mobile phone as illustrated), and so forth. Additionally, although a single computing device 102 is shown, the computing device 102 is implementable via a plurality of different devices, such as multiple servers utilized by an entity to perform operations "over the cloud" as described in FIG. 22.

The computing device 102 is illustrated as including content editing system 104, which is representative of functionality for generating and editing digital content, such as web content. Although illustrated as implemented locally at the computing device 102, functionality of the content editing system 104 is also implementable in whole or part via functionality available via a network, such as part of a web service and/or in a cloud-based implementation. The content editing system 104 includes a color module 106 that is implemented to control various color attributes of digital content, such as selecting colors, manipulating colors, and so forth. The computing device 102 also includes color data 108 stored on a storage 110 and which is utilized and/or generated by the content editing system 104 via the color module 106.

To enable various functionality described herein, the color module 106 includes a contrast module 112 and contrast graphical user interfaces (GUIs) 114. The contrast module 112 represents functionality to perform various aspects of modification of color contrast ratio based on target contrast described herein, such as for selecting color sets that comply with target contrast ratios. The contrast GUIs 114 represent functionality for enabling user interaction with the content editing system 104, such as for invoking functionality of the contrast module 112.

The color data 108 represents data generated and utilized by the color module 106 and includes color groups 116, color sets 118, content 120, and target contrasts 122. The color groups 116 represent different distinct groups of colors that are available to be utilized by the content editing system 104, such as colors for content creation and editing. At least some of the color groups 116 are organized based on distinct color spaces, such as red, green blue (RGB), hue saturation lightness (HSL), CIELAB (LAB), CIE 1931 (e.g., CIE xyY), and so forth. The color sets 118 represent sets (e.g., pairs) of colors selected from the color groups 116. A user, for instance, selects instances of the color sets 118 for generating and editing content, such as via input to the content editing system 104. The content 120 represents different types and collections of content to which the color sets 118 are applicable and include content types such as backgrounds and foreground content, e.g., text and other graphical components.

The target contrasts 122 represent different defined contrast ratio values, such as for enabling optimal viewability of different color sets 118. In at least one implementation the target contrasts 122 include contrast ratios defined for accessibility standards, such as the Web Content Accessibility Guidelines (WCAG) defined by the Web Accessibility Initiative (WAI) of the World Wide Web Consortium (W3C).

The computing device 102 further includes a display device 124 on which a contrast graphical user interface (GUI) 114a is displayed. Generally, the contrast GUI 114a enables a user to select instances of the color sets 118, view contrast-related information about the selected color sets, and to modify the color sets 118 to generate color sets with different contrast ratios. Examples of different contrast GUIs 114 are detailed below.

In general, the described systems and modules are implementable at least partially in hardware of a computing device, such as the computing device 102. Further, functionality, features, and concepts described in relation to the examples above and below are employable in the context of the example procedures. Additionally, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Systems and Implementation Scenarios

The following discussion describes example systems and implementation scenarios for modification of color contrast ratio based on target contrast. Aspects of each of the systems and scenarios are implementable in hardware, firmware, software, or a combination thereof.

Figure 2B:
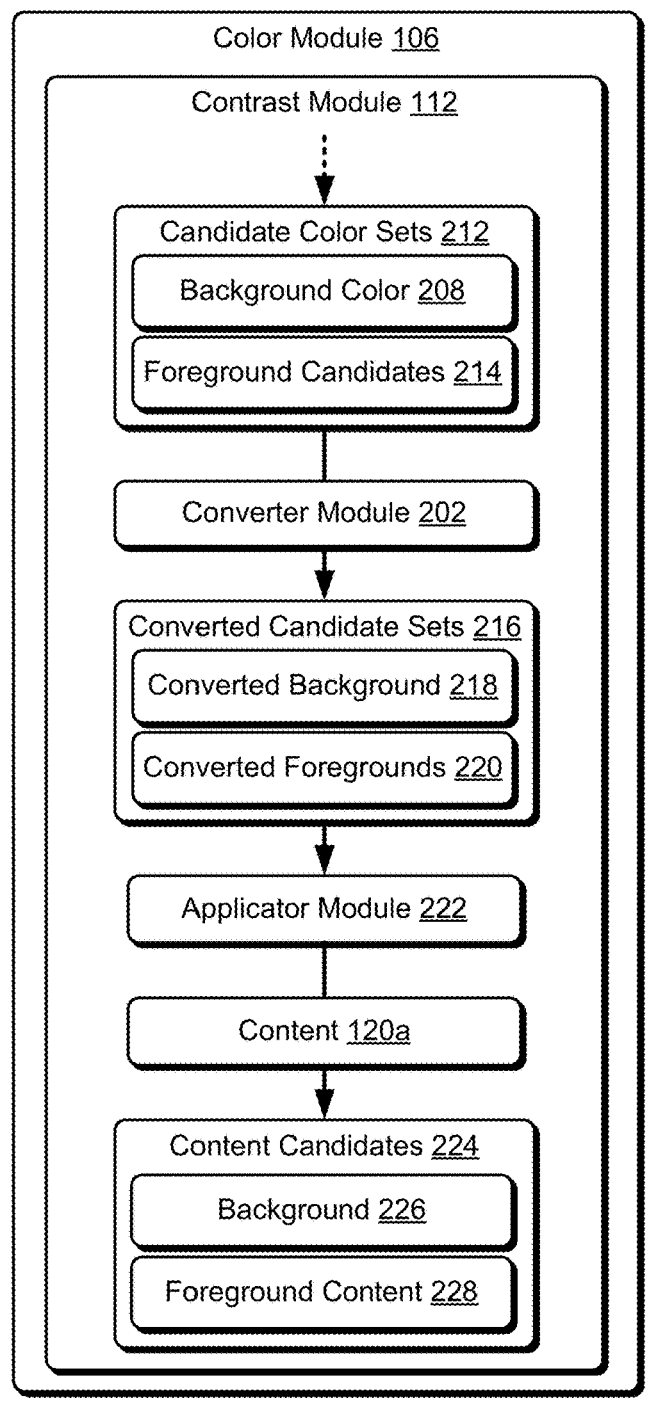
FIG. 2b depicts a system for utilizing the candidate color sets.
Figure 2C:
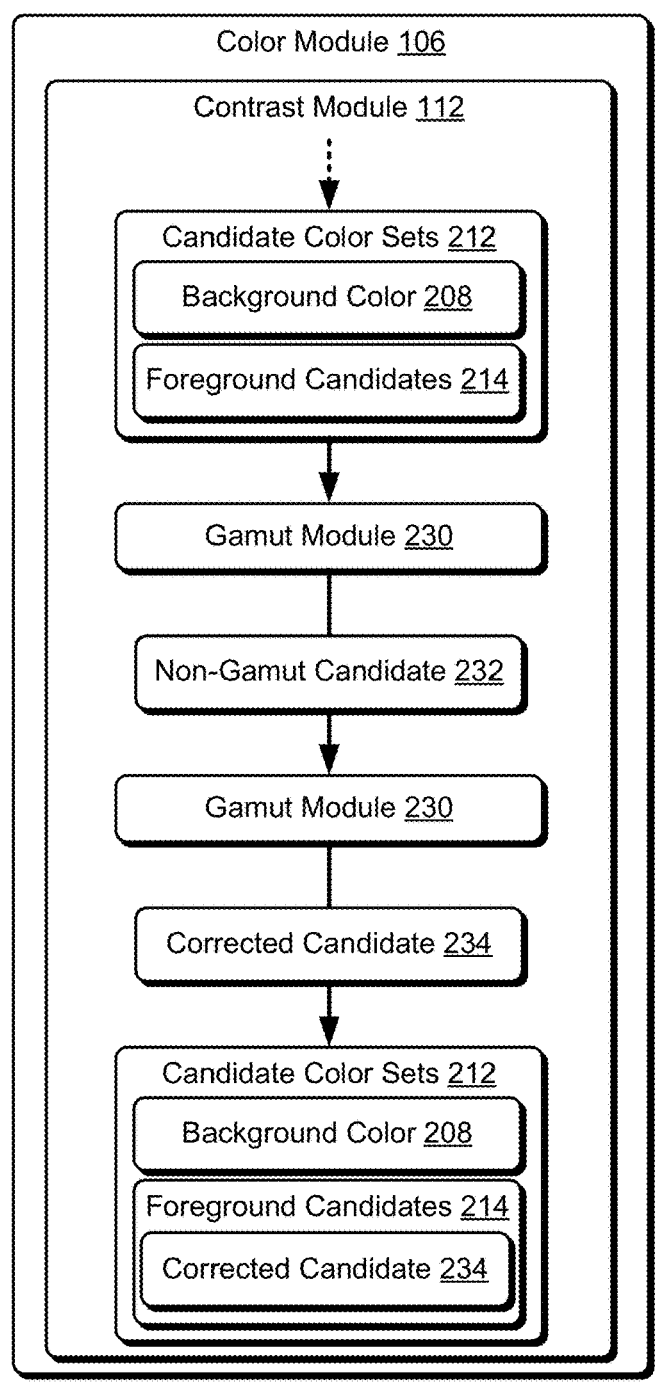
FIG. 2c depicts a system for performing color correction as part of determining color candidates for contrast improvement.

FIGS. 2a, 2b, 2c depict aspects of example systems for performing modification of color contrast ratio based on target contrast. FIG. 2a, for instance, depicts a system 200a for generating content candidates that exhibit different contrast values in accordance with one or more implementations. In the system 200a the contrast module 112 receives an input color set 118a, such as via user selection of a set (e.g., pair) of colors from a particular color group 116. A converter module 202 then converts the color set 118a into a converted color set 204. Generally, converting the color set 118a involves converting the color set 118a from one color space to a different color space. For instance, the color set 118a is originally in an RGB color space (e.g., sRGB) and the converter module 202 converts the color set 118a into the CIE xyY color space to generate the converted color set 204.

A selector module 206 processes the converted color set 204 to specify a particular color as a background color 208. Generally, the selector module 206 utilizes various logic to specify the background color 208. For instance, consider that the color set 118a is applied to an instance of content 120a. The content 120a, for instance, includes an image (e.g., text and/or shapes) of one color over a background of a different color. In this particular example, the selector module 206 identifies the image and the background and thus specifies the color of the background as the background color 208. The background color 208, however, is identifiable in various other ways, however, such as via user input to designate a particular color as the background color. A generator module 210 applies values for the target contrasts 122 to the background color 208 to generate candidate color sets 212 that include the background color 208 and foreground color candidates ("foreground candidates") 214.

In at least one implementation, the generator module 210 generates the foreground candidates 214 using the following equation:

$$Y_f = R(Y_{bg} + 0.05) - 0.05$$

where $Y_f$ is a luminance value for each foreground candidate 214, R is a target contrast 122, and $Y_{bg}$ is the luminance of the background color 208. Where multiple target contrasts 122 are specified, the equation is evaluated for each target contrast 122 to generate individual foreground candidates 214. In at least one implementation, where $Y_f > 1$ or $Y_f < 0$, the resulting background color is considered invalid. In such a scenario, the system utilizes either black or white for $Y_f$. For instance, where $Y_f > 1$ the system 200a returns white for a background color 208 and black for a foreground candidate 214; however, where $Y_f < 1$ the system 200a returns black for a background color 208 and white for a foreground candidate 214. In at least one implementation the system 200a outputs a flag (e.g., in an instance of a contrast GUI 114) indicating whether the system 200a is able to achieve the target contrast ratio R. Alternatively or additionally, individual applications enforce determining whether the target contract ratio R is achieved. Further, and as detailed subsequently with reference to FIGS. 2b, 20-21d, if $0 \geq Y_f \geq 1$, a color gamut correction procedure is applied to place $Y_f$ within a color gamut that is usable to display the colors, e.g., the candidate color sets 118.

FIG. 2b depicts a system 200b for utilizing the candidate color sets 212. The system 200b, for example, represents a continuation of the system 200a. After the foreground candidates 214 are generated, the converter module 202 converts the candidate color sets 212 into converted color candidate sets 216 including a converted background color 218 and converted foreground candidates ("converted foregrounds") 220. In at least one implementation, the conversion involves converting the candidate color sets 212 into a color space utilized for displaying the candidate color sets 212, e.g., the original color space utilized for the input color set 118a. For instance, as mentioned above, the input color set 118a is in an RGB (e.g., sRGB) color space and is converted to the CIE xyY color space to generate the converted color set 204. Thus, in at least one implementation, the converter module 202 converts the candidate color sets 212 from the CIE xyY color space to the RGB color space to generate the converted candidate sets 216 in the RGB color space.

An applicator module 222 then applies the converted candidate sets 216 to the content 120a to generate content candidates 224 to which the converted candidate sets 216 are applied. The content candidates 224, for instance, each include a background 226 to which the converted background 218 is applied and foreground content 228 to which the converted foregrounds 220 are applied. In at least one implementation, different individual instances of the content candidates 224 include a common converted background 218 for the background 226 and different converted foregrounds 220 for the foreground content 228. Alternatively or additionally, some content candidates 224 are generated to include different converted backgrounds 218 (e.g., different colors) for the background 226 and different converted foregrounds 220 for the foreground content 228. As further discussed below, the content candidates 224 are displayable to a user, such as via the display device 124.

FIG. 2c depicts a system 200c for performing color correction as part of determining color candidates for contrast improvement. The system 200c, for instance, is implemented in conjunction with the system 200a as part of generating the candidate color sets 212. In the system 200c, a gamut module 230 processes the foreground candidates 214 to identify a non-gamut candidate 232 that represents a foreground candidate 214 that deviates from color values (e.g., luminance values) within a defined color gamut, such as the RGB color gamut. As further detailed below with reference to FIGS. 20-21d, for instance, the gamut module 230 compares Y values for the foreground candidates 214 to a color gamut map to determine whether the Y values overlap with the gamut map or deviate from the gamut map. When a Y value for a particular foreground candidate 214 deviates from the gamut map, this represents a non-gamut candidate 232.

Continuing, the gamut module 230 applies a gamut correction to the non-gamut candidate 232 to generate a corrected candidate 234. Generally, the gamut correction involves adjusting a color value (e.g., chromaticity values) of the non-gamut candidate 232 to place the color value within defined gamut values and generate the corrected candidate 234. Example aspects of a gamut correction are described below with reference to FIGS. 20-21d. The gamut module 230 replaces the non-gamut candidate 232 in the candidate color sets 212 with the corrected candidate 234. The candidate color sets 212 with the corrected candidate 234 are usable to generate instances of the content candidates 224, such as described in the system 200b.

While the scenarios 200a-200c are discussed primarily with reference to modifying foreground colors, implementations described herein are implementable to modify background colors additionally or alternatively to modifying foreground colors to generate the candidate color sets 212.

The following section describes some example implementation scenarios for modification of color contrast ratio based on target contrast in accordance with one or more implementation. Generally, the various scenarios are implementable according to the systems described above and the procedures described below.

FIG. 3 depicts an example implementation scenario 300 for checking contrast values for different color combinations in accordance with one or more implementations. The scenario 300 includes a contrast GUI 302 which enables a user to select different color combinations and to view color options for achieving different contrast ratios. The contrast GUI 302, for example, represents an instance of the contrast GUIs 114. The contrast GUI 302 includes a color set 118a which in at least one implementation represents a set of colors selected by a user for a contrast check. The contrast GUI 302 also includes a color preview 304, a rating indication 306, and contrast options 308. The color preview 304 includes a visual preview of the color set 118a as applied to a set of content, which in this example includes foreground text in a foreground color 310 and a background in a background color 312. A contrast indicator 314 indicates a contrast ratio for the color set 118a as displayed in the color preview 304, which in this example indicates a contrast ratio of 1.4.

The rating indication 306 indicates a contrast rating for the indicated contrast ratio which in the example identifies "none" which indicates that the contrast ratio has not achieved an acceptable contrast rating. In at least one implementation the rating indication 306 is based on compliance with the WCAG rating system for rating contrast ratios based on their correspondence to defined standards for vision accessible contrast ratios. For instance, a "AA" rating indicates acceptable compliance with the standards and a "AAA" rating indicates optimal compliance with the standards. Thus, in this particular example, the color set 118*a* does not achieve any of these defined ratings.

The contrast options 308 identify the color set 118*a* ("Starting Colors") and include other color sets ("Better Contrast Combinations") that are selectable to achieve an improvement in contrast ratio. Generally, selecting a color set from the contrast options 308 causes further information about the color set to be displayed. For instance, a color set 118*b* is selected which causes a contrast ratio indicator 316 for the color set 118*b*. The contrast ratio indicator 316, for instance, indicates a contrast ratio of "3.0" for the color set 118*b*. In at least one implementation the color set 118*b* is selectable to replace the color set 118*a*. For instance, further selecting the color set 118*b* causes the color set 118*b* to be applied to the content in the color preview 304.

Figure 4:
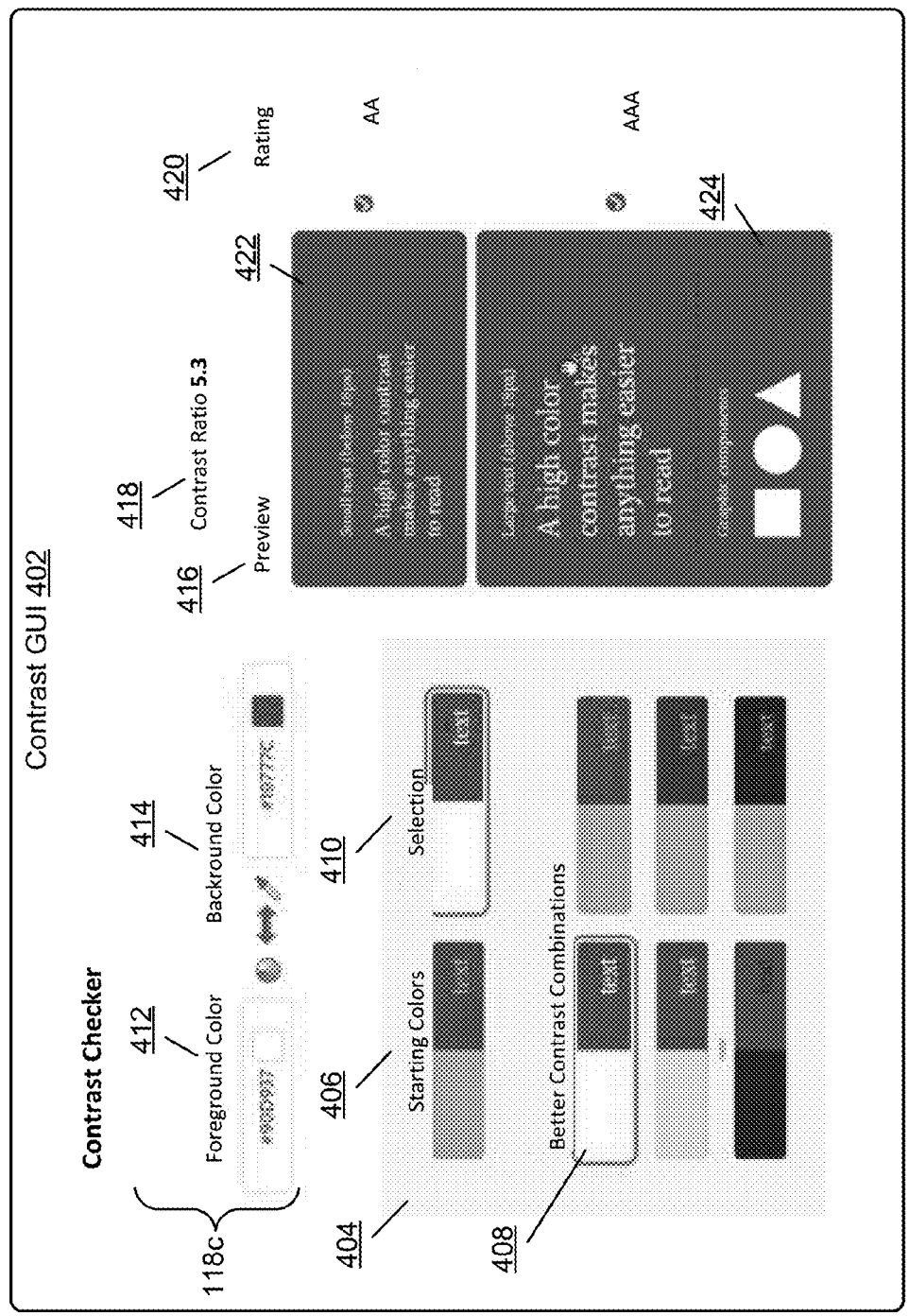
FIG. 4 depicts an example implementation scenario for applying a contrast option.

FIG. 4 depicts an example implementation scenario 400 for applying a contrast option in accordance with one or more implementations. The scenario 400 includes a contrast GUI 402, which represents an instance of the contrast GUIs 114. The contrast GUI 402 identifies a color set 118*c* which in this particular example is based on a selected color set from contrast options 404. A user, for instance, initiates a contrast check starting with starting colors 406 and then selects a candidate color set 408 to replace the starting colors 406. A selection 410, for example, indicates that the user has selected the candidate color set 408. Accordingly, a foreground color 412 and a background color 414 from the candidate color set 408 are applied to content in a color preview 416. Further, a contrast indicator 418 indicates a contrast ratio for the color set 118*c*, e.g., 5.3. A rating indication 420 indicates contrast ratios for the content in the color preview 416. For instance, content 422 is indicated as having a AA rating, and content 424 is indicated as having a AAA rating. As mentioned above, in at least one implementation the ratings are based on rating standards and mechanisms defined by the WCAG contrast rating system.

Figure 5:
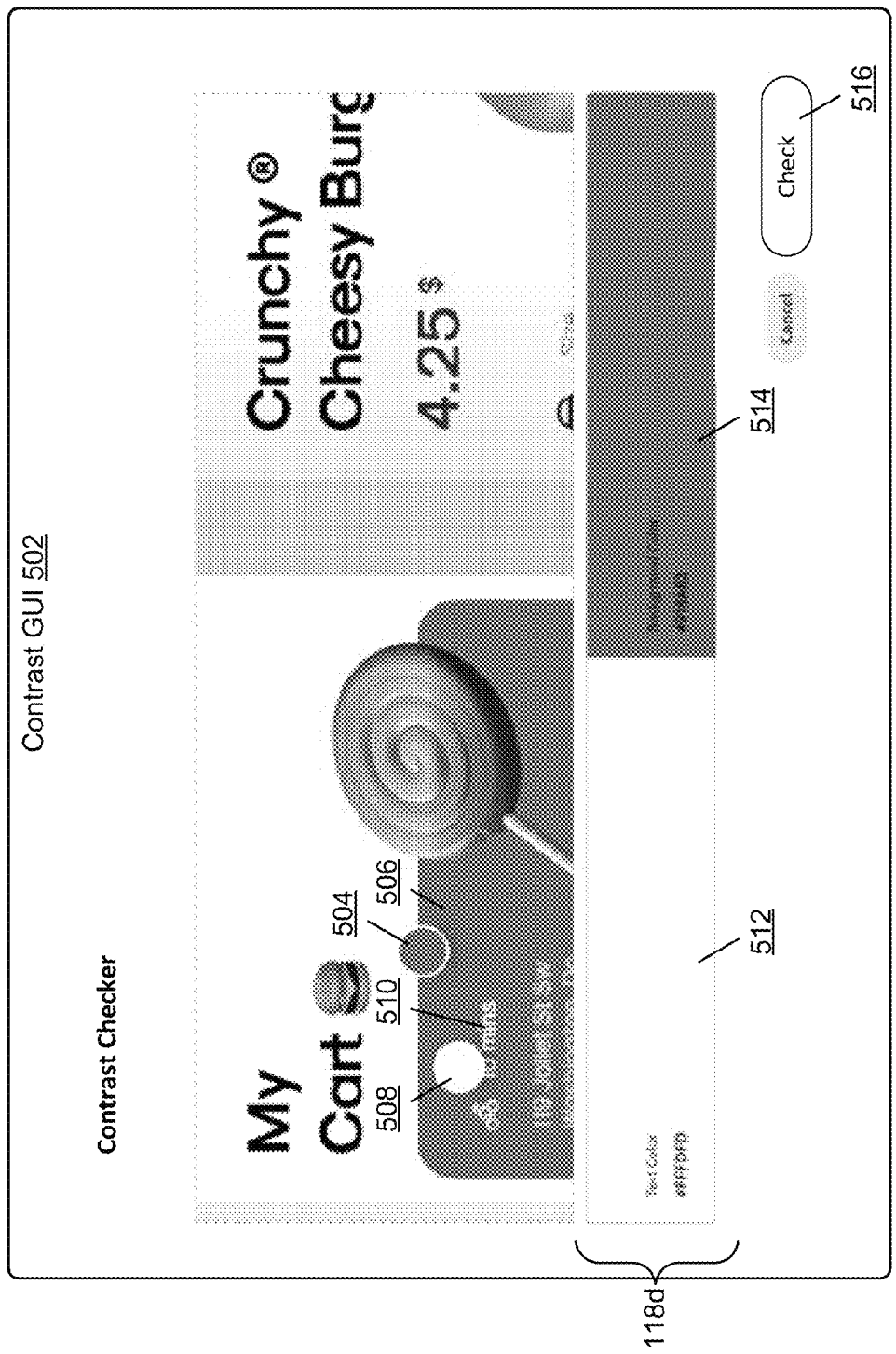
FIG. 5 depicts a scenario for selecting content for a contrast check.

FIG. 5 depicts a scenario 500 for selecting content for a contrast check in accordance with one or more implementations. The scenario 500 includes a contrast GUI 502, which represents an instance of the contrast GUIs 114. The contrast GUI 502 includes a variety of content that is selectable to initiate a contrast check. Accordingly, a user manipulates a background selector 504 to select content 506 to be utilized for a background color and manipulates a foreground selector 508 to select content 510 to be utilized as a foreground color. The background selector 504 and the foreground selector 508, for instance, are manipulable to different portions of content displayed in the contrast GUI 502 to select different background and foreground content for a contrast check.

Based on the selection of the content 506, 510, a color set 118*d* is extracted from the content. The color set 118*d*, for instance, includes a foreground color 512 extracted from the content 510 and a background color 514 extracted from the content 506. Accordingly, a user selects a check control 516 displayed in the contrast GUI 502 to initiate a contrast check of the color set 118*d*.

Figure 6:
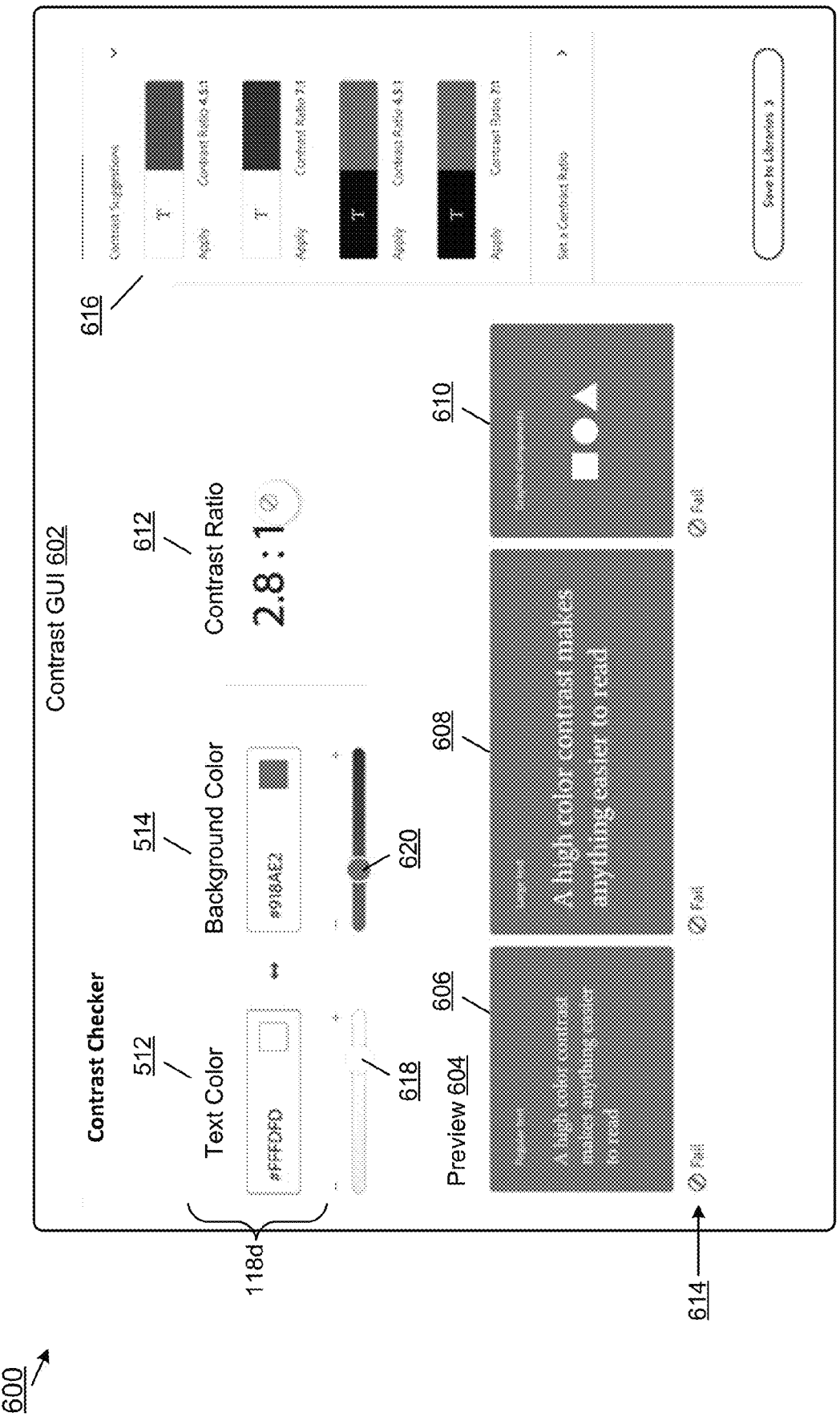
FIG. 6 depicts a scenario for implementing a contrast check based on selected content.

FIG. 6 depicts a scenario 600 for implementing a contrast check based on selected content in accordance with one or more implementations. The scenario 600, for instance, represents a continuation of the scenario 500 and is initiated based on a selection of the check control 516. The scenario 600 includes a contrast GUI 602, which represents an instance of the contrast GUIs 114. The contrast GUI 602 includes the color set 118*d* with the foreground color 512 and the background color 514, and a color preview 604 with the foreground color 512 and the background color 514 applied to sets of content. In this particular example the content includes regular text content 606, large text content 608, and graphical component content 610. The content 606, for instance, represents text that is below 18 point, the content 608 represents text that is 18 point or larger, and the content 610 represents visual components other than text. In at least one implementation, these content classifications are based on the WCAG content accessibility guidelines.

A contrast indicator 612 indicates a contrast ratio of 2.8 for the color set 118*d* and a rating indication 614 indicates that this contrast ratio fails to achieve an acceptable rating for the content 606, 608, 610, e.g., based on the WCAG rating guidelines. To enable color sets with better contrast ratios, contrast options 616 are presented in the contrast GUI 602. The contrast options 616, for example, include color sets with higher contrast ratios and in at least some implementations represent color sets that achieve acceptable contrast ratings.

The contrast GUI 602 also includes an adjustment control 618 which is selectable to adjust the foreground color 512 and an adjustment control 620 which is selectable to adjust the background color 514. For instance, manipulating the adjustment control 618 changes (e.g., increases or decreases) a luminance value of the foreground color 512 and manipulating the adjustment control 620 changes a luminance value of the background color 514. Generally, the adjustment controls 618, 620 enable a user to manually adjust the color set 118*d* such as to attempt to achieve a color set with a higher contrast ratio.

Figure 7:
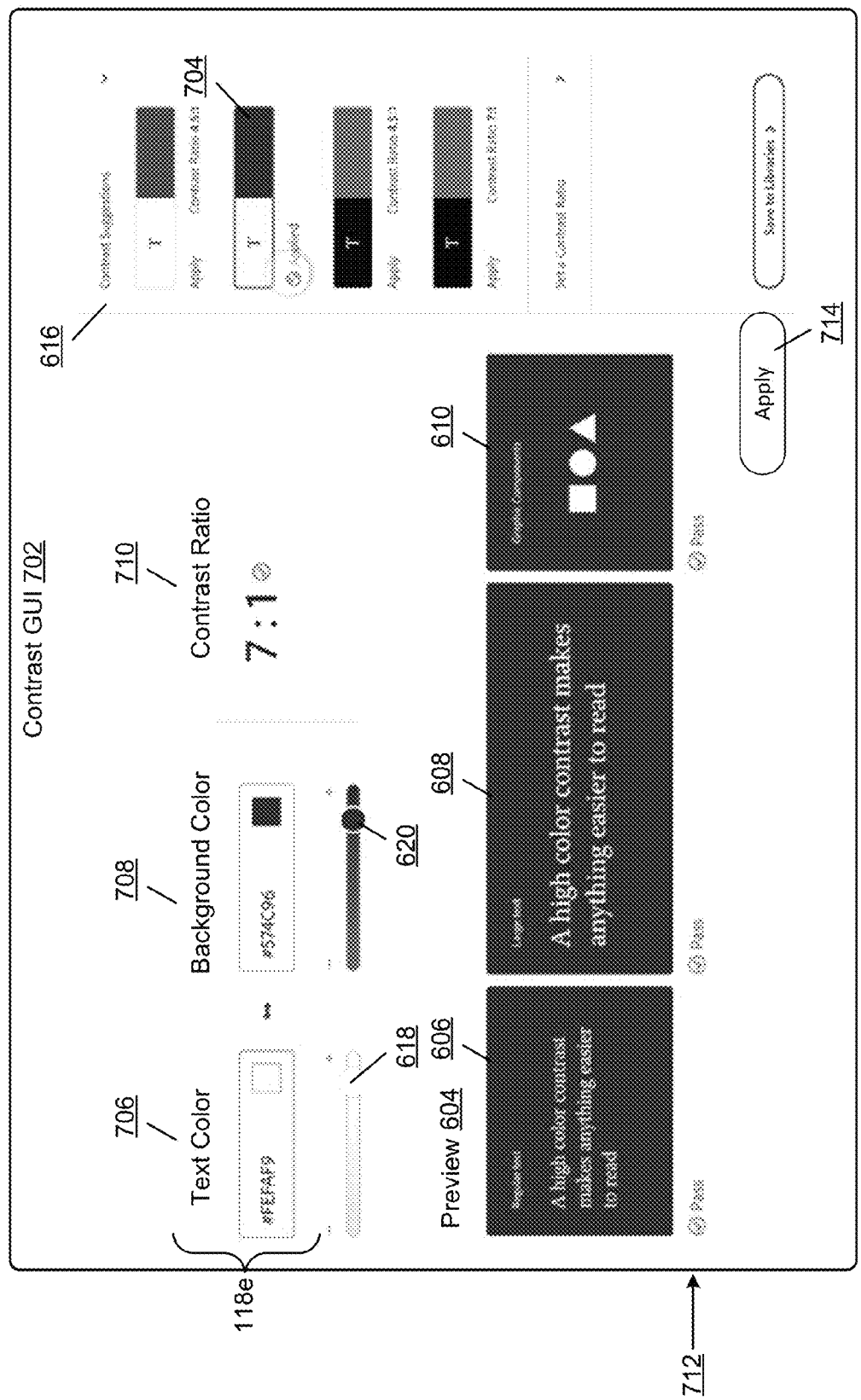
FIG. 7 depicts a scenario for modifying a color set.

FIG. 7 depicts a scenario 700 for modifying a color set in accordance with one or more implementations. The scenario 700, for instance, represents a continuation of the scenarios 500, 600. The scenario 700 includes a contrast GUI 702, which in at least one implementation represents a modification of the contrast GUI 602. In the scenario 700, a user selects a candidate set 704 of colors from the contrast options 616 and the contrast module 112 applies the candidate set 704 to the content 606, 608, 610. The candidate set 704, for instance, represents a color set 118*e* with a foreground color 706 and a background color 708 that are applied to the content 606, 608, 610. A contrast indicator 710 indicates that the color set 118*e* achieves a contrast ratio of 7 and a rating indication 712 indicates that the contrast ratio passes threshold contrast values for the content 606, 608, 610. In at least one implementation the threshold contrast values are based on WCAG guidelines for minimum contrast values for particular content types. For instance, WCAG ratings AA and/or AAA are utilized to determine whether the color set 118*e* meets the criteria for these ratings.

Alternatively or additionally to obtaining the color set 118*e* via selection of the candidate set 704 a user manipulates the adjustment control 618 and/or the adjustment control 620 to transform the color set 118*d* into the color set 118*e*.

Further to the scenario 700, the contrast GUI 702 includes an apply control 714 that is selectable to apply the color set 118*e* to a set of content. For instance, with reference to the scenario 500, selecting the apply control 714 causes the color module 106 to automatically apply the foreground color 706 to the content 510 and the background color 708 to the content 506. Generally, this enables the content 506, 510 to achieve a higher contrast ratio than originally indicated in the scenarios 500, 600.

Figure 8:
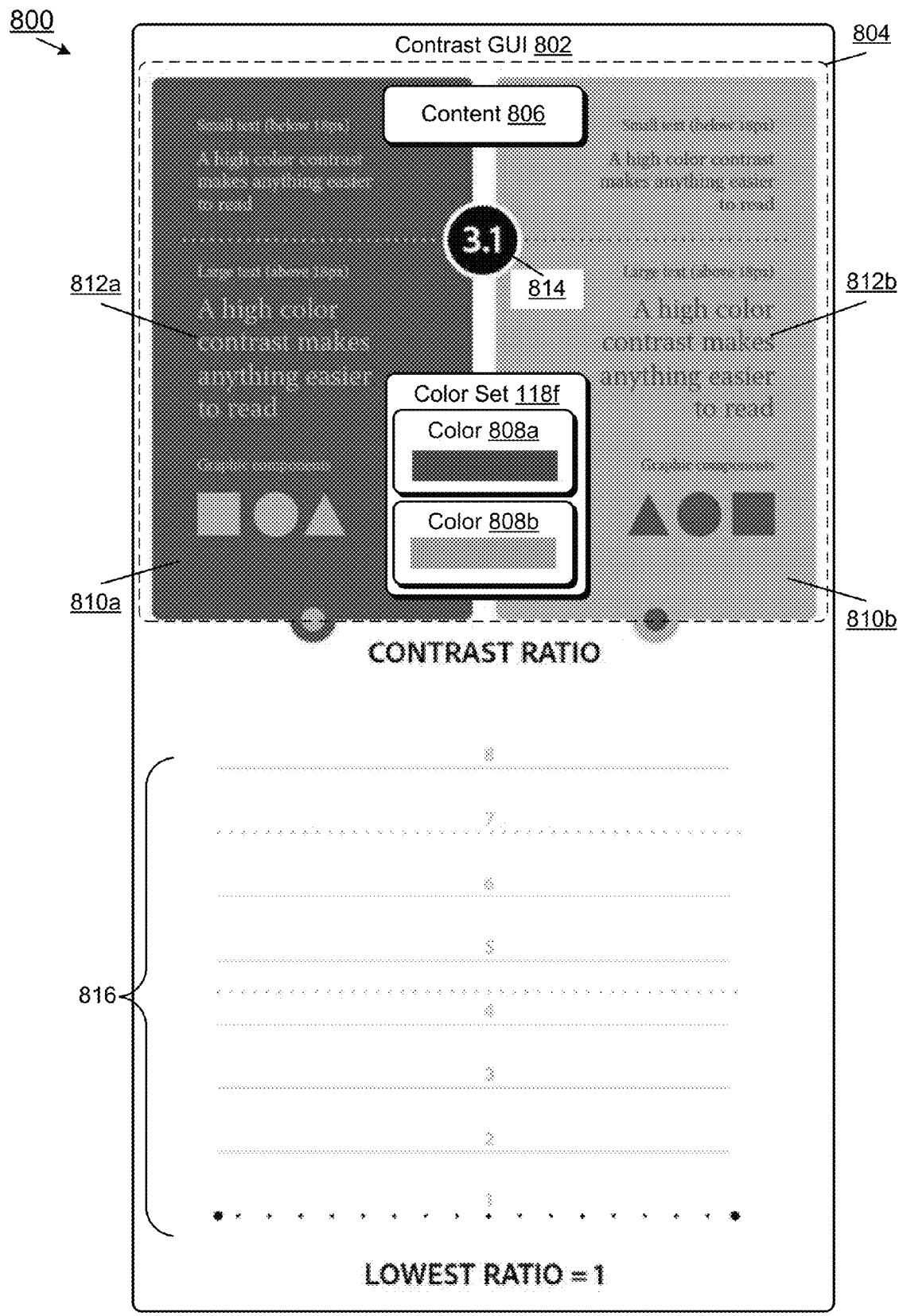
FIG. 8 depicts a scenario for initiating a contrast check and color manipulation process.

FIG. 8 depicts a scenario 800 for initiating a contrast check and color manipulation process in accordance with one or more implementations. The scenario 800 includes a contrast GUI 802 which represents an instance of the contrast GUIs 114. The contrast GUI 802 displays a color preview 804 in which a color set 118*f* is applied to a set of content 806. The color set 118*f* includes a color 808*a* and a color 808*b*. In the left portion of the color preview 804 the color 808*a* is applied to a background 810*a* of the content 806 and the color 808*b* is applied to foreground content 812*a* of the content 806, e.g., text and graphical components of the content 806. In the right portion of the color preview 804 the color 808*a* is applied to foreground content 812*b* of the content 806 and the color 808*b* is applied to a background 810*b*. The contrast GUI 806 also includes a contrast indicator 814 indicating a contrast ratio of 3.1 for the color set 118*f* and a contrast scale 816 that depicts different contrast ratios in a vertical arrangement. In this particular example, the contrast scale 816 ranges from contrast values of 1-8. This particular implementation of the contrast scale 816 is not to be construed as limiting, however, and a variety of different visual arrangements and contrast value ranges are utilizable within the scope of the disclosed implementations.

Figure 9:
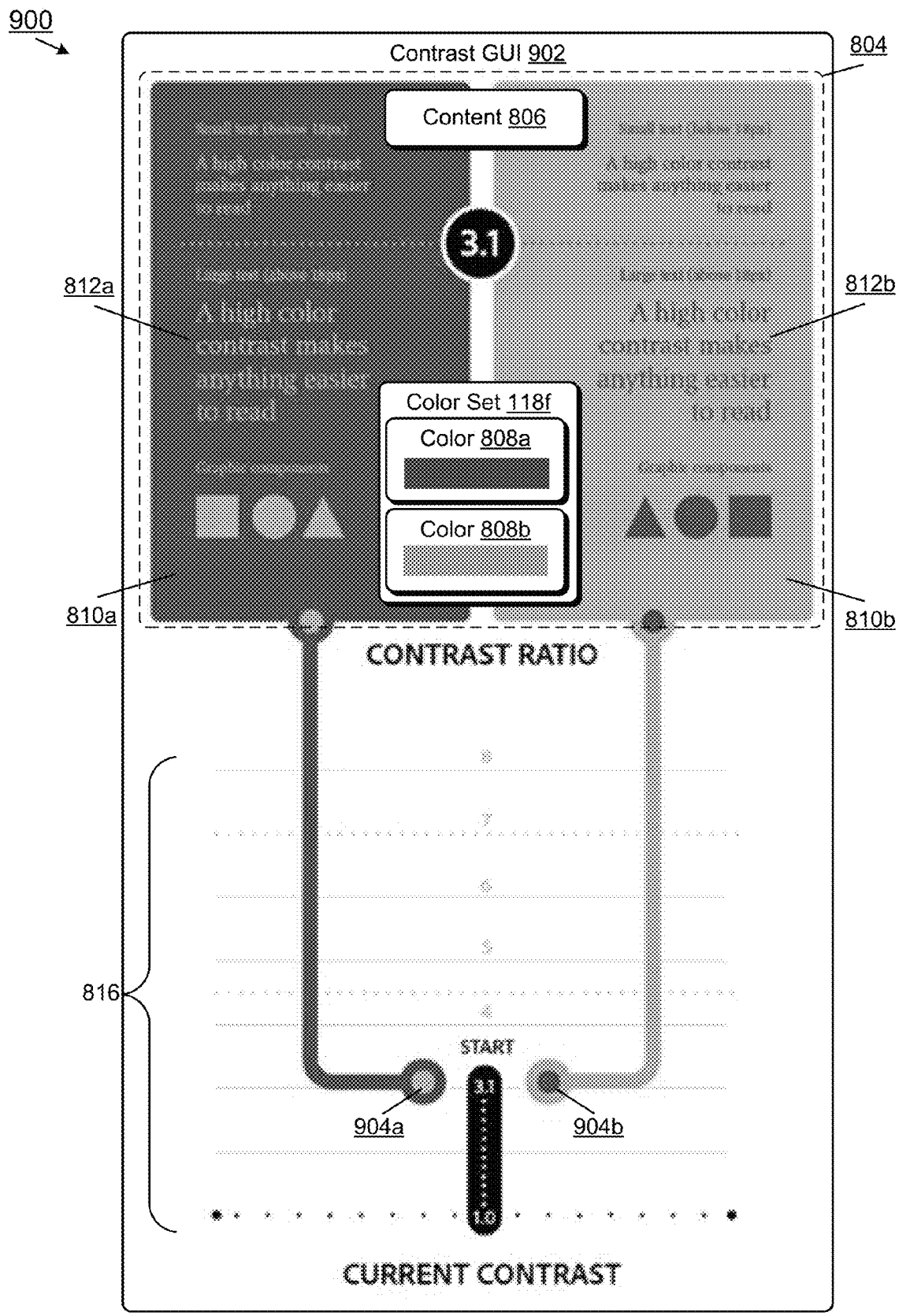
FIG. 9 depicts a scenario for enabling color manipulation in conjunction with a contrast check.

FIG. 9 depicts a scenario 900 for enabling color manipulation in conjunction with a contrast check in accordance with one or more implementations. The scenario 900, for example, represents continuation of the scenario 800. The scenario 900 includes a contrast GUI 902, which in at least one implementation represents a modification of the contrast GUI 802. In the contrast GUI 902 a scale indicator 904*a* is displayed on the contrast scale 816 indicating a contrast ratio of the color set 118*f* in the left portion of the color preview 804, and a scale indicator 904*b* is displayed indicating a contrast ratio of the color set 118*f* in the right portion of the color preview 804. In this particular example the scale indicators 904*a*, 904*b* are positioned at the 3.1 position of the contrast scale 816 to indicate a contrast ratio of 3.1 for the content 806 with the color set 118*f* applied.

Figure 10:
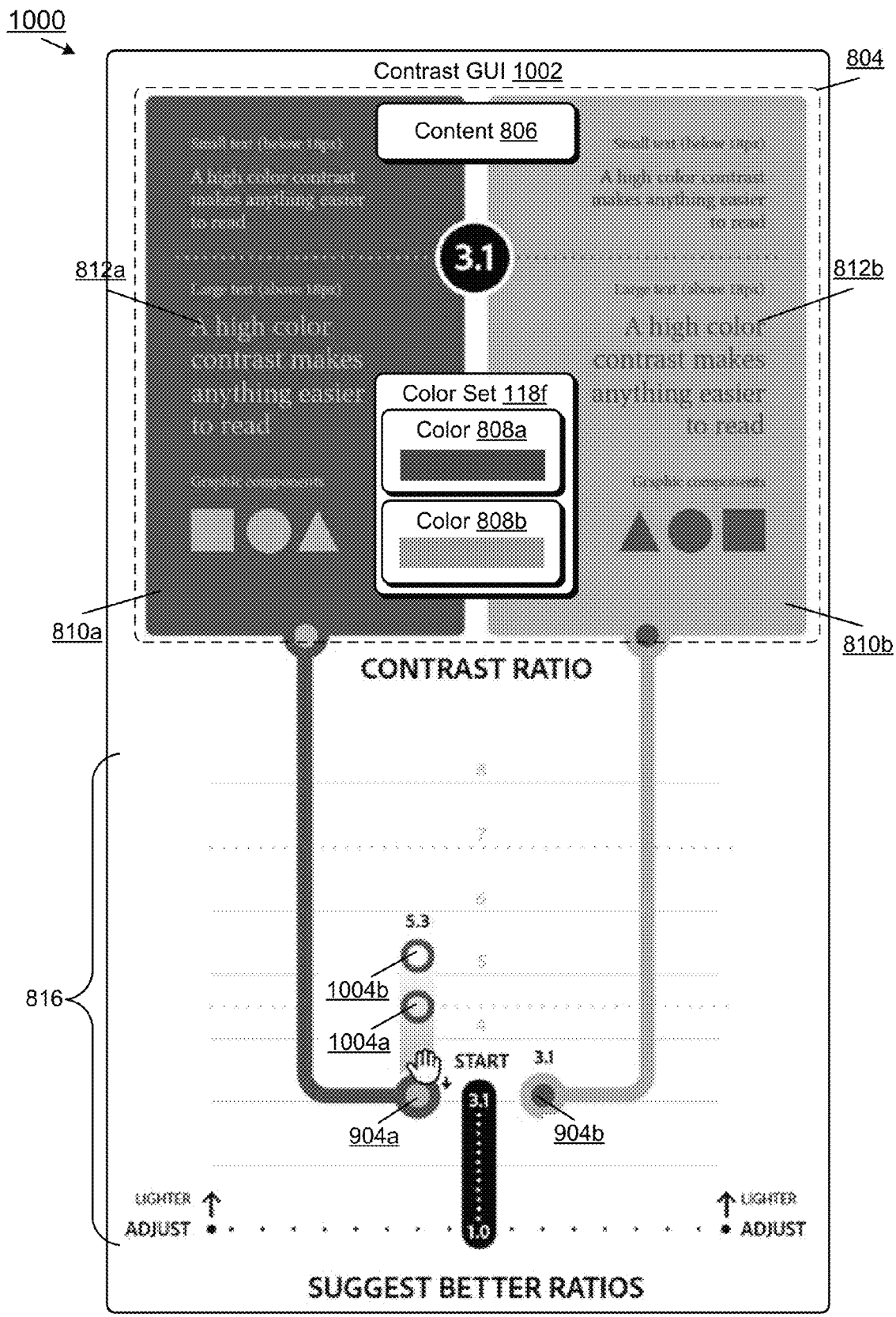
FIG. 10 depicts a further scenario for enabling color manipulation in conjunction with a contrast check.

FIG. 10 depicts a further scenario 1000 for enabling color manipulation in conjunction with a contrast check in accordance with one or more implementations. The scenario 1000, for example, represents continuation of the scenarios 800, 900. The scenario 1000 includes a contrast GUI 1002, which in at least one implementation represents a modification of the contrast GUI 902. The contrast GUI 1002 includes contrast candidates 1004*a*, 1004*b* depicted in the contrast scale 816. The contrast candidates 1004*a*, 1004*b*, for instance, are selectable to modify the color set 118*f* to obtain different contrast values. For example, selecting the contrast candidates 1004*a*, 1004*b* modifies a color of the foreground content 812*a* and a background color 810*b* of the content 806. In at least one implementation the contrast candidates 1004*a*, 1004*b* are selectable to increase a lightness (e.g., luminance) of the color 808*b*.

Notice in this particular example that no contrast candidates are presented for the right portion of the content 806, e.g., relative to the scale indicator 904*b*. In at least one implementation, this indicates that no modifications to increase a lightness of the color 808*a* are available to increase the contrast ratio content 806.

Figure 11:
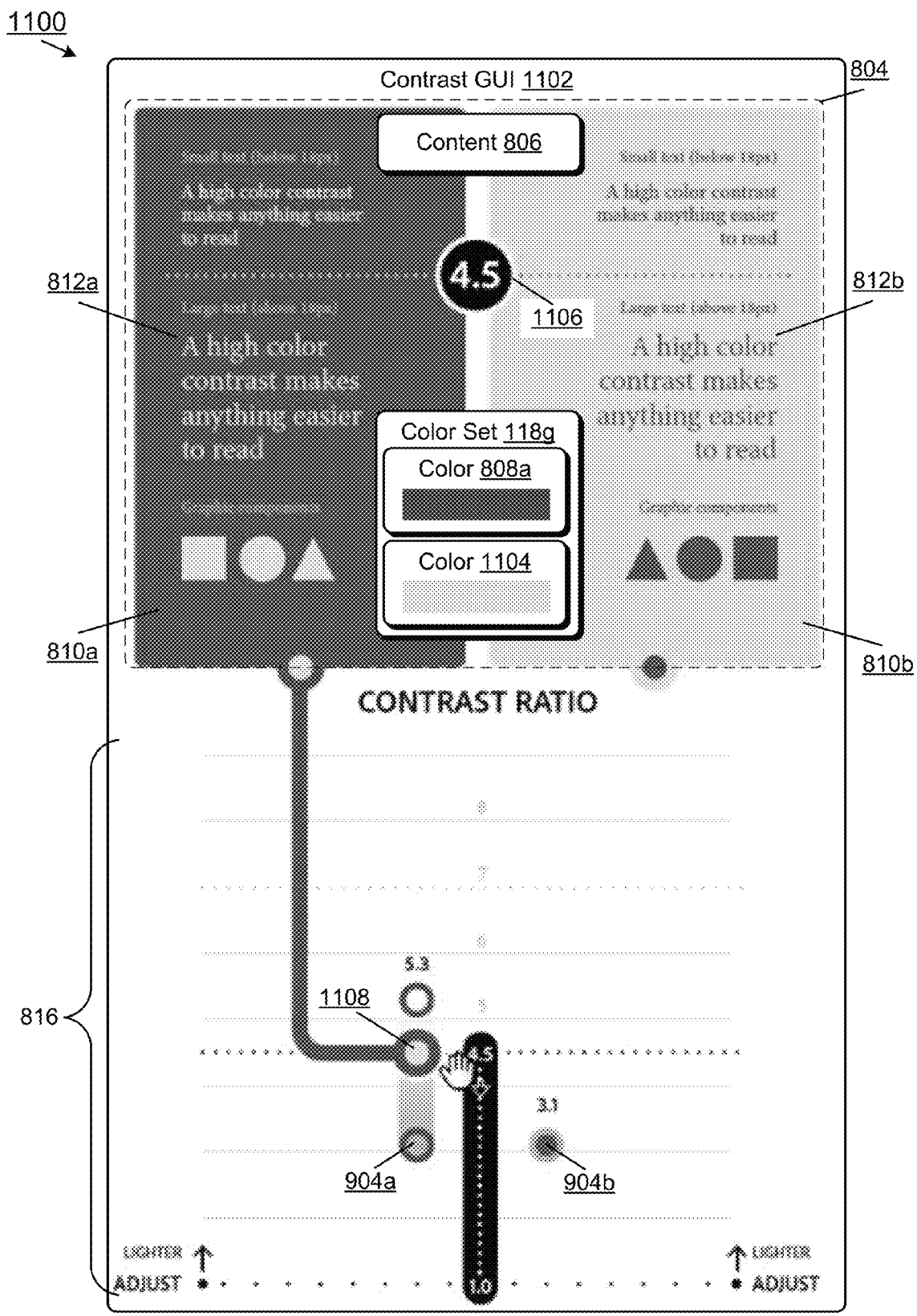
FIG. 11 depicts a further scenario for enabling color manipulation in conjunction with a contrast check.

FIG. 11 depicts a further scenario 1100 for enabling color manipulation in conjunction with a contrast check in accordance with one or more implementations. The scenario 1100, for example, represents continuation of the scenarios 800-1000. The scenario 1100 includes a contrast GUI 1102, which in at least one implementation represents a modification of the contrast GUI 1002. In the scenario 1100, a user selects the contrast candidate 1004*a* which causes a modification of the color set 118*f* to generate a new color set 118*g* which is applied to the content 806 in the color preview 804. The color set 118*g*, for instance, includes the color 808*a* and a new color 1104. For example, the color 1104 is generated by increasing a lightness value of the color 808*b*. Further, in response to selection of the contrast candidate 1004*a*, the color 1104 is applied to the foreground content 812*a* and the background 810*b*.

Based on the new color set 118*g* a contrast indicator 1106 indicates a contrast ratio of 4.5 for the color set 118*g*. Further, a scale indicator 1108 within the contrast scale 816 is updated to reflect a contrast ratio of 4.5 for the color set 118*g*.

Figure 12:
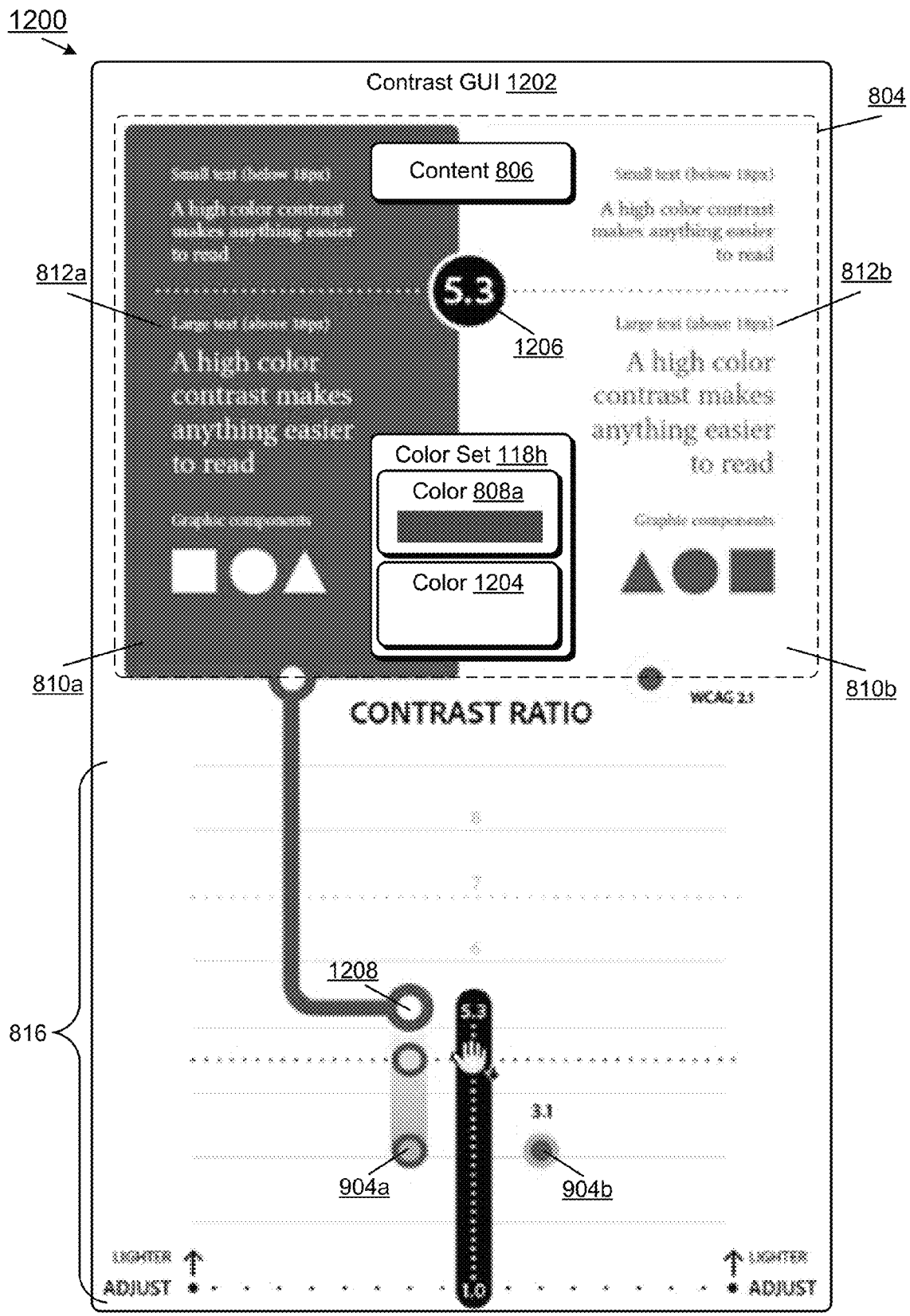
FIG. 12 depicts a further scenario for enabling color manipulation in conjunction with a contrast check.

FIG. 12 depicts a further scenario 1200 for enabling color manipulation in conjunction with a contrast check in accordance with one or more implementations. The scenario 1200, for example, represents continuation of the scenarios 800-1100. The scenario 1200 includes a contrast GUI 1202, which in at least one implementation represents a modification of the contrast GUI 1102. In the scenario 1200, a user selects the contrast candidate 1004*b* which causes a modification of the color set 118*g* to generate a new color set 118*h* which is applied to the content 806 in the color preview 804. The color set 118*h*, for instance, includes the color 808*a* and a new color 1204. The color 1204, for example, is generated by increasing a lightness value of the color 1104. Further, in response to selection of the contrast candidate 1004*b*, the color 1204 is applied to the foreground content 812*a* and the background 810*b*.

Based on the new color set 118*h* a contrast indicator 1206 indicates a contrast ratio of 5.3 for the color set 118*h*. Further, a scale indicator 1208 within the contrast scale 816 is updated to reflect a contrast ratio of 5.3 for the color set 118*h*. Thus, the scenarios 1100, 1200 depict implementations in which color manipulation is applied to achieve better (e.g., higher) contrast ratios for color sets.

Figure 13:
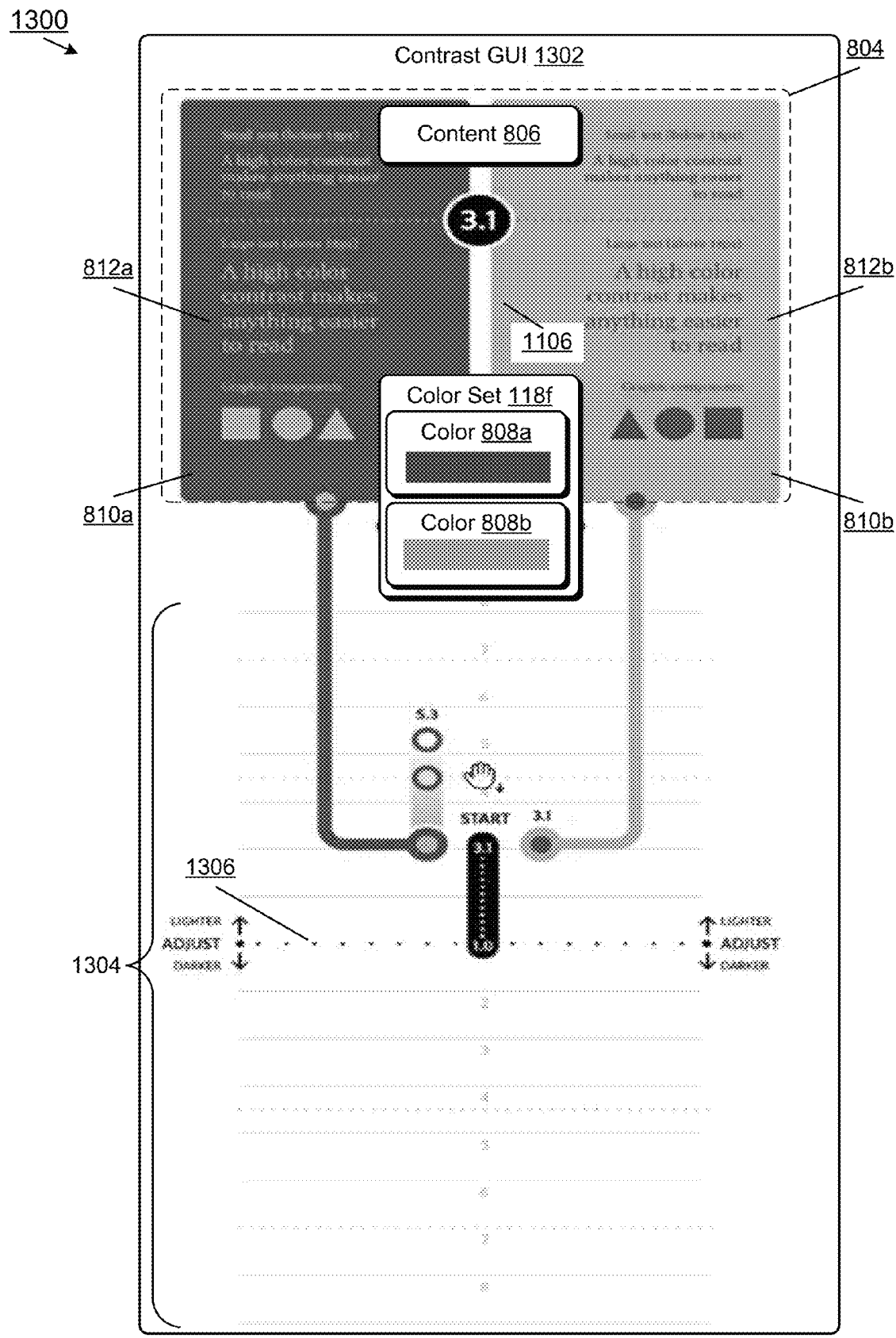
FIG. 13 depicts a further scenario for enabling color manipulation in conjunction with a contrast check.

FIG. 13 depicts a further scenario 1300 for enabling color manipulation in conjunction with a contrast check in accordance with one or more implementations. The scenario 1300, for example, represents continuation of the scenarios 800-1200. The scenario 1300 includes a contrast GUI 1302, which in at least one implementation represents a modification of the contrast GUIs described above. The contrast GUI 1302 includes the color preview 804 depicting the color set 118*f* applied to the content 806. The contrast GUI 1302 also includes a contrast scale 1304 which in at least one implementation represents an extension and/or modification of the contrast scale 816 discussed above. For instance, in addition to enabling the color set 118*f* to be modified to generate lighter colors as with the contrast scale 816, the contrast scale 1304 enables darker colors to be generated to modify contrast ratios. The contrast scale 1304, for example, includes a baseline contrast 1306 of 1.0 and values above the baseline contrast 1306 represent lighter color values (e.g., higher Y values) and values below the baseline contrast 1306 represent darker color values, e.g., lower Y values.

Figure 14:
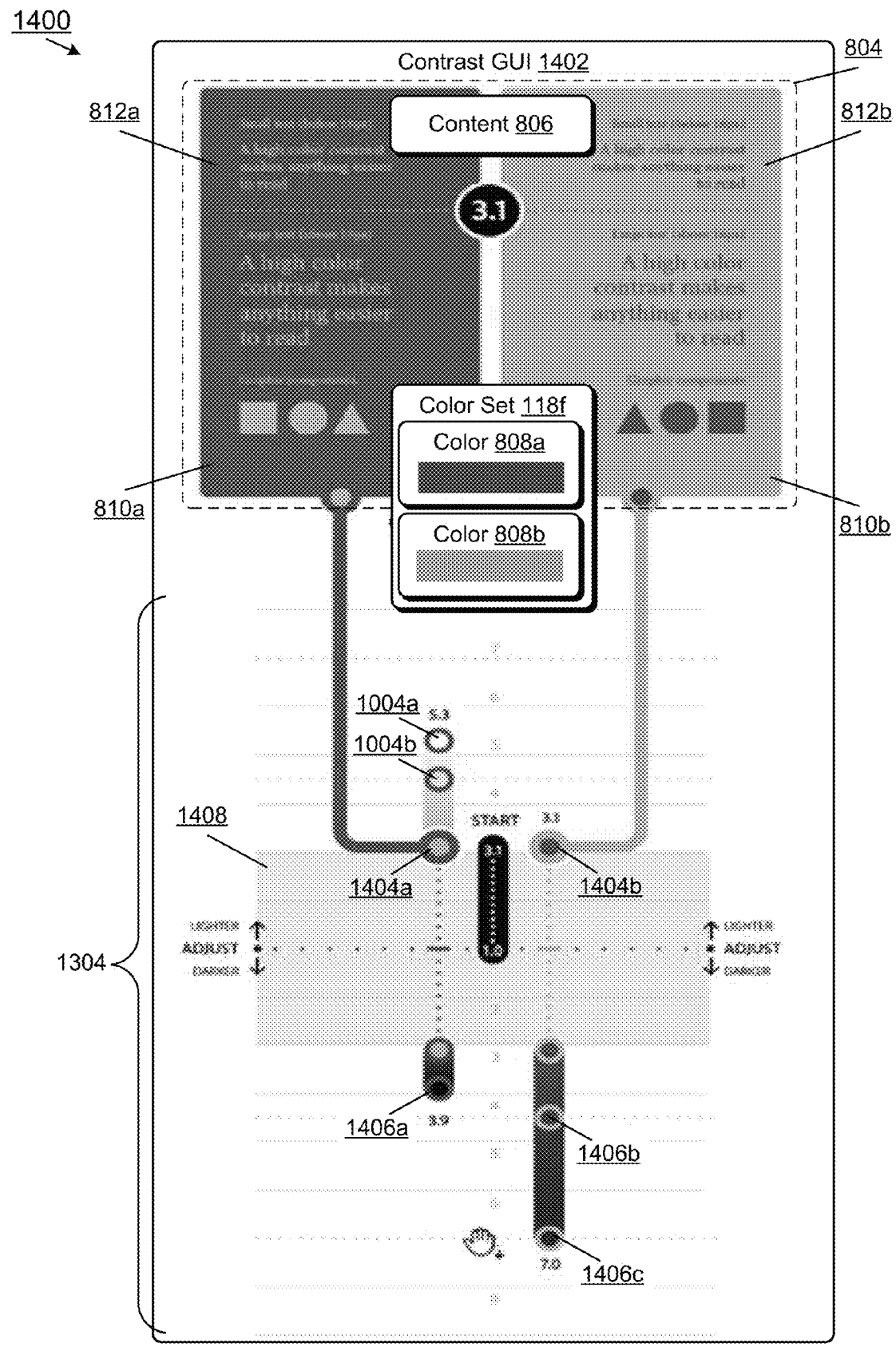
FIG. 14 depicts a further scenario for enabling color manipulation in conjunction with a contrast check.

FIG. 14 depicts a further scenario 1400 for enabling color manipulation in conjunction with a contrast check in accordance with one or more implementations. The scenario 1400, for example, represents continuation of the scenarios 800-1300. The scenario 1400 includes a contrast GUI 1402, which in at least one implementation represents a modification of the contrast GUIs described above. The contrast GUI 1402 includes the color preview 804 depicting the color set 118*f* applied to the content 806, a scale indicator 1404*a* indicating a contrast ratio of the foreground content 812*a* relative to the background 810a, and a scale indicator 1404b indicating a contrast ratio of the foreground content 812b relative to the background 810b.

The contrast GUI 1402 also includes the contrast candidates 1004a, 1004b discussed above, and additionally contrast candidates 1406a, 1406b, and 1406c. The contrast candidates 1406, for instance, are selectable to modify the color set 118f to generate color sets with differing contrast ratio values. In at least one implementation, the contrast candidates 1406 are based on instances of the target contrasts 122. The contrast candidate 1406a, for example, represents a candidate for modification of the color 808b, e.g., for decreasing lightness of the color 808b. Further, the contrast candidates 1406b, 1406c represent candidates for modification of the color 808a. e.g., for decreasing lightness value of the color 808a. For instance, selecting the contrast candidate 1406a generates a darker color to replace the color 808b, and selecting the contrast candidates 1406b, 1406c generates darker colors to replace the color 808a.

Notice that the contrast GUI 1402 also includes a reduction zone 1408 in the contrast scale 1304 as indicated as the greyed-out area of the contrast scale 1304. Generally, this represents contrast ratio values that decrease from the current contrast ratio of 3.1. This provides a visual indication of decreasing contrast ratios within the reduction zone 1408 and in at least one implementation the contrast module 112 does not enable contrast ratios within the reduction zone 1408 to be selected.

Figure 15:
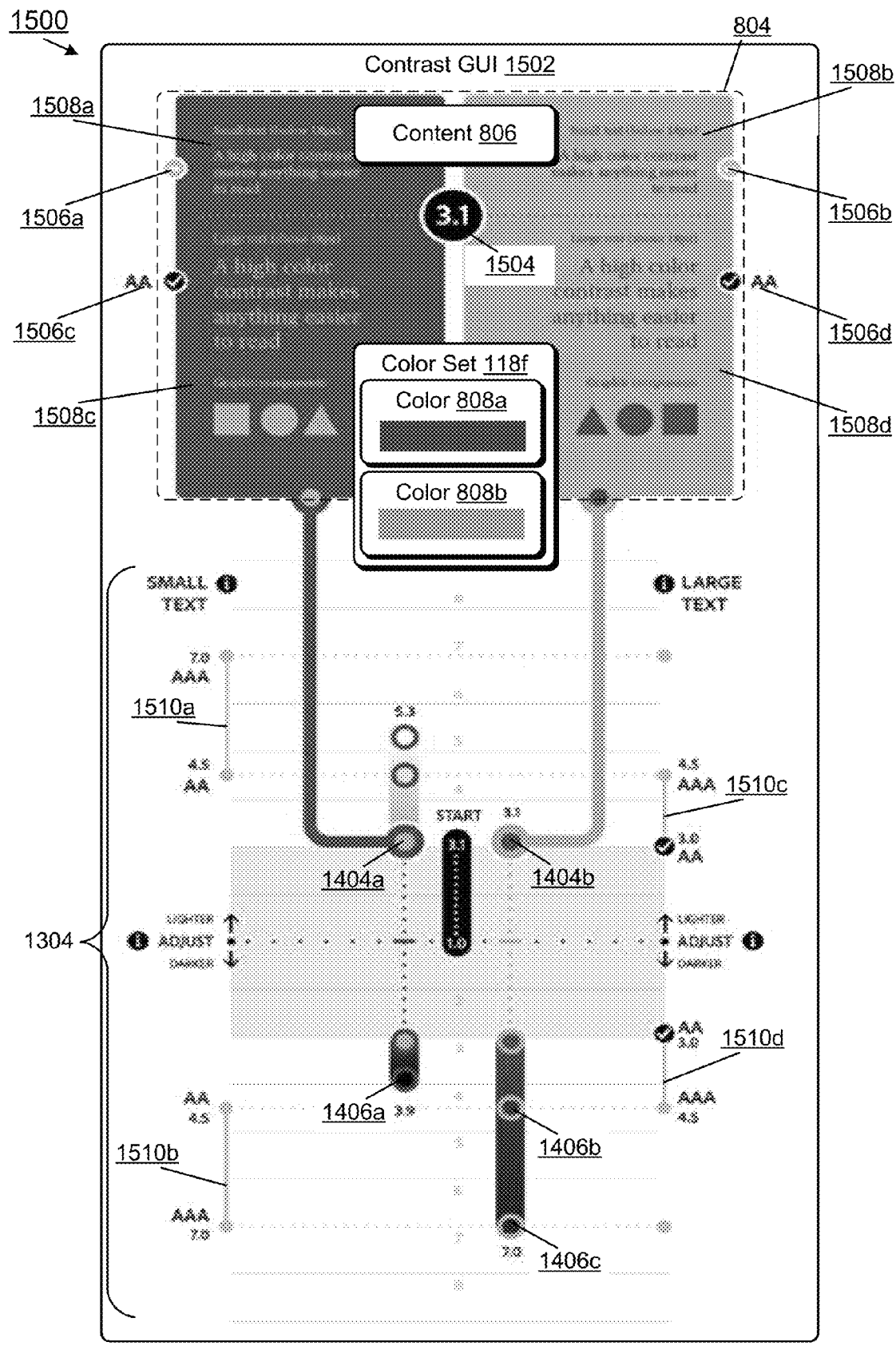
FIG. 15 depicts a scenario for indicating contrast ratio ratings for different contrast ratio values.

FIG. 15 depicts a scenario 1500 for indicating contrast ratio ratings for different contrast ratio values in accordance with one or more implementations. The scenario 1500, for example, represents continuation of the scenarios 800-1400. The scenario 1500 includes a contrast GUI 1502, which in at least one implementation represents a modification of the contrast GUIs described above. The contrast GUI 1502 includes the color preview 804 depicting the color set 118f applied to the content 806, the scale indicators 1404, and the contrast candidates 1406. The contrast GUI 1502 also includes a contrast indicator 1504 indicating a contrast ratio of 3.1 for the color set 118f as applied to the content 806 and different contrast ratings 1506 for different contrast ratio values and/or contrast candidates. The contrast ratings 1506, for example, are based on the WCAG accessibility ratings for different types of content. For instance, a contrast rating 1506a for content 1508a indicates that the contrast value of 3.1 does not achieve an acceptable contrast rating, as with a contrast rating 1506b for content 1508b. A contrast rating 1506c and contrast rating 1506d, however, indicate that content 1508c and content 1508d achieve a AA contrast rating.

Further to the scenario 1500 the contrast scale 1304 indicates contrast ratings for different contrast values for the content 806. For instance, a rating scale 1510a indicates ratings for different color values and contrast values for increasing a lightness of the color 808b, starting with AA for a contrast value of 4.5 and proceeding to AAA for a contrast value of 7.0. Further, a rating scale 1510b indicates different color values and contrast values for decreasing a lightness of the color 808b, starting with AA for a contrast value of 4.5 and proceeding to AAA for a contrast value of 7.0. A contrast scale 1510c indicates ratings for different color values and contrast values for increasing a lightness of the color 808a, starting with AA for a contrast value of 3.0 and proceeding to AAA for a contrast value of 4.5. Further, contrast scale 1510d indicates ratings for different color values and contrast values for decreasing a lightness of the color 808a, starting with AA for a contrast value of 3.0 and proceeding to AAA for a contrast value of 4.5. Thus, a user is able to select different contrast candidates to achieve different contrast ratings.

Figure 16:
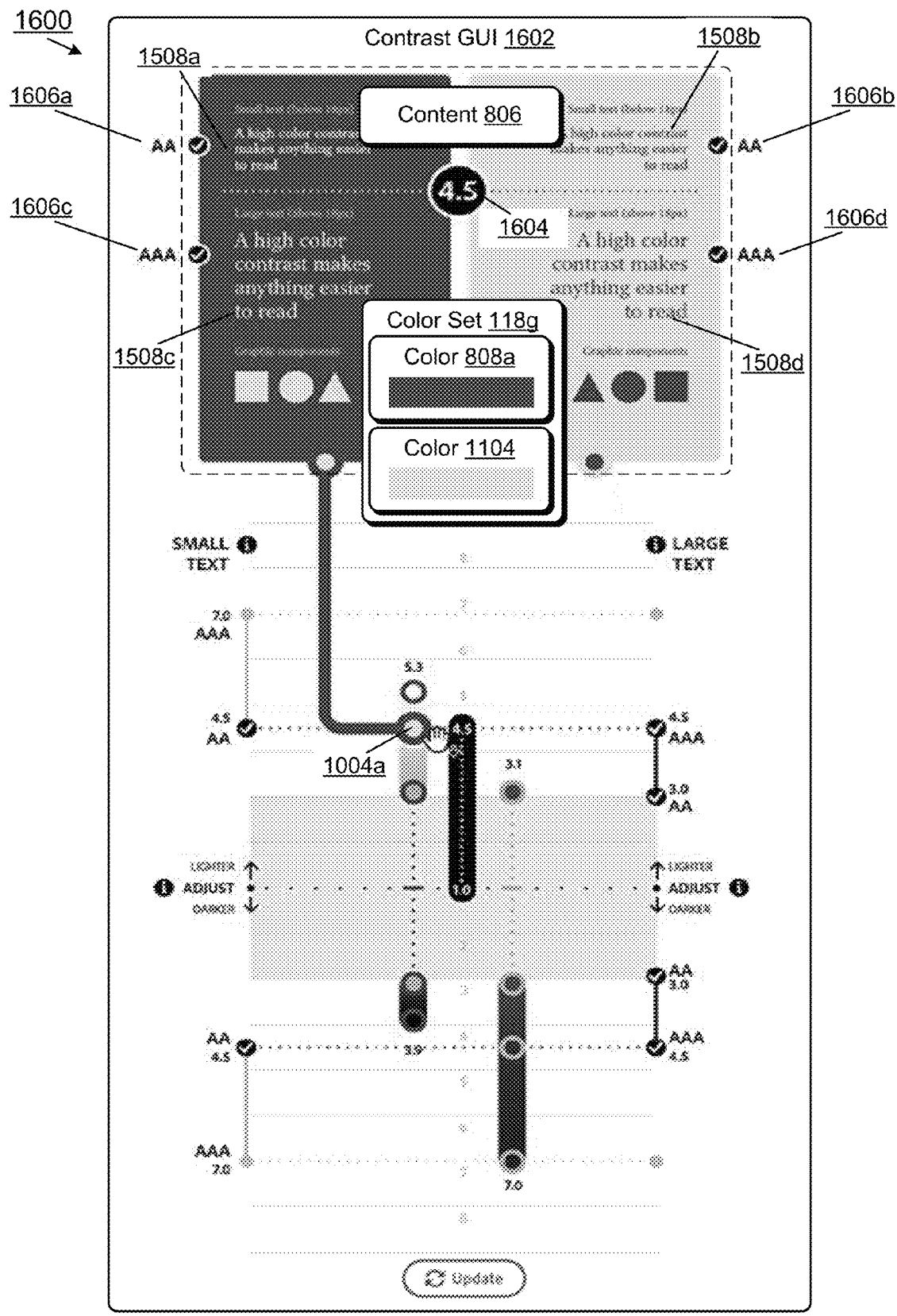
FIG. 16 depicts a scenario for adjusting color attributes to achieve different contrast ratio ratings for different contrast ratio values.

FIG. 16 depicts a scenario 1600 for adjusting color attributes to achieve different contrast ratio ratings for different contrast ratio values in accordance with one or more implementations. The scenario 1600, for example, represents continuation of the scenarios 800-1500. The scenario 1600 includes a contrast GUI 1602, which in at least one implementation represents a modification of the contrast GUIs described above. In the scenario 1600, a user selects the contrast candidate 1004a which causes the color set 118f to be replaced with the color set 118g and the color set 118g to be applied to the content 806. Accordingly, a contrast indicator 1604 indicates a contrast ratio of 4.5 for the color set 118g as applied to the content 806.

Based on the change in contrast ratio a contrast rating 1606a for the content 1508a indicates a rating of AA for the content 1508a and a contrast rating 1606b indicates a rating of AA for the content 1508b. Further, a contrast rating 1606c indicates a rating of AAA for the content 1508c and a contrast rating 1606d indicates a contrast rating of AAA for the content 1508d.

Figure 17:
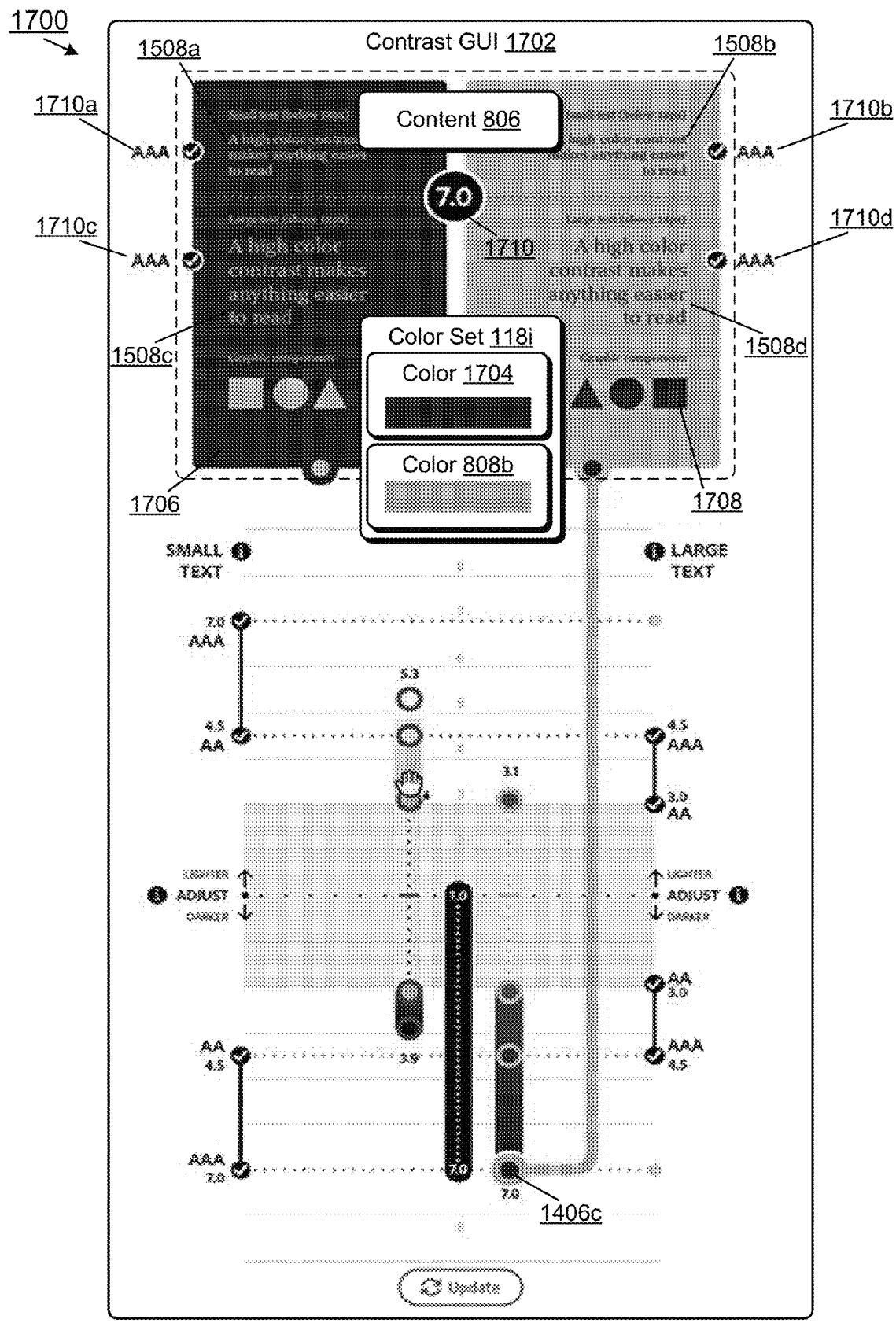
FIG. 17 depicts a scenario for adjusting color attributes to achieve different contrast ratio ratings for different contrast ratio values.

FIG. 17 depicts a scenario 1700 for adjusting color attributes to achieve different contrast ratio ratings for different contrast ratio values in accordance with one or more implementations. The scenario 1700, for example, represents continuation of the scenarios 800-1600. The scenario 1700 includes a contrast GUI 1702, which in at least one implementation represents a modification of the contrast GUIs described above. In the scenario 1700, a user selects the contrast candidate 1406c which causes the color set 118f to be replaced with a color set 118i and the color set 118i to be applied to the content 806. For instance, a color 1704 replaces the color 808a and the color 1704 is applied to a background 1706 of the content 806 and to foreground content 1708 of the content 806. Accordingly, a contrast indicator 1710 indicates a contrast ratio of 7.0 for the color set 118i as applied to the content 806.

Based on the change in contrast ratio a contrast rating 1710a for the content 1508a indicates a rating of AAA for the content 1508a and a contrast rating 1710b indicates a rating of AAA for the content 1508b. Further, a contrast rating 1710c indicates a rating of AAA for the content 1508c and a contrast rating 1710d indicates a contrast rating of AAA for the content 1508d. Thus, as depicted in the example scenarios, contrast ratings are dynamically updatable by modifying color attributes applied to content to generate different contrast ratio values.

Example Procedures

The following discussion describes procedures that are implementable utilizing the previously described systems and devices. Aspects of the procedures are able to be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-17.

Figure 18:
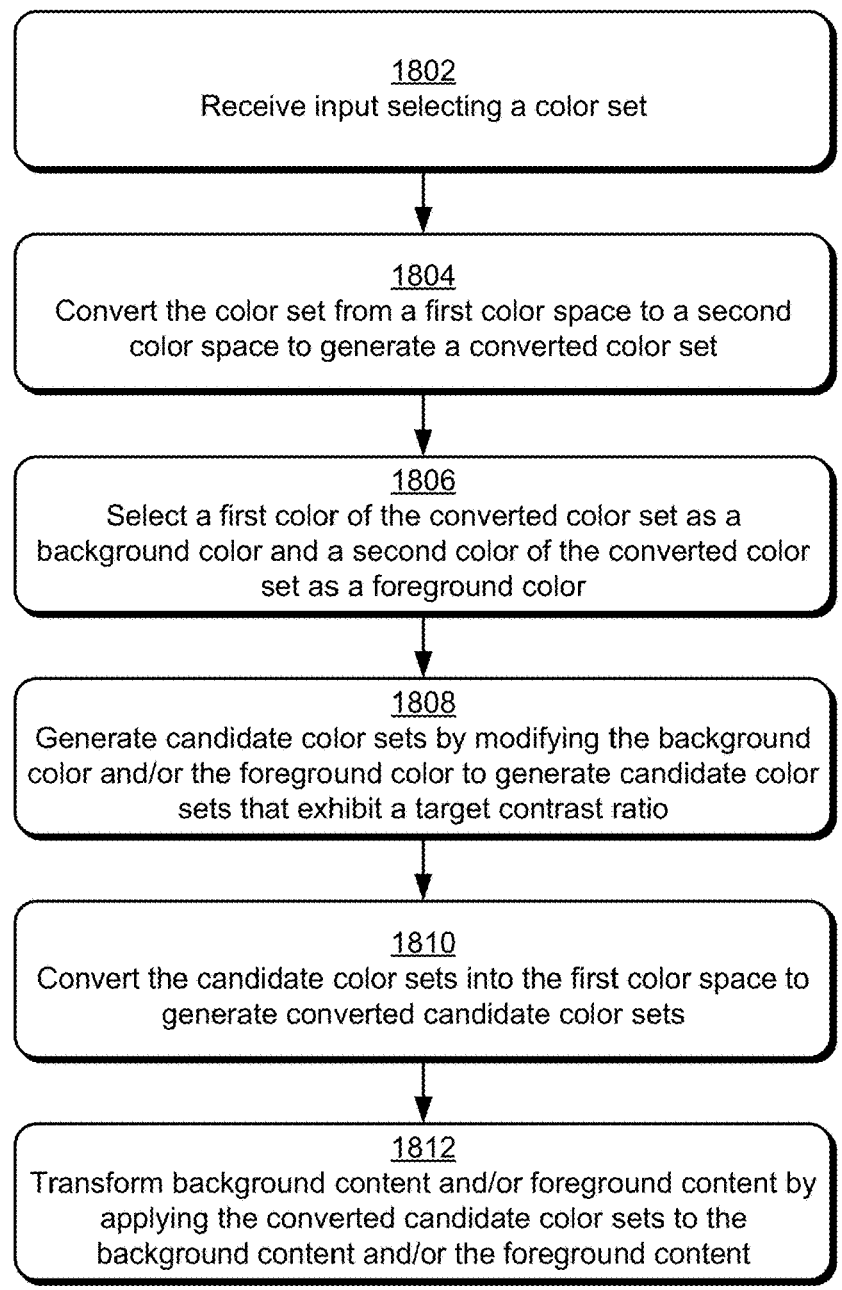
FIG. 18 depicts a procedure in an example implementation for modification of color contrast ratio based on target contrast.

FIG. 18 depicts a procedure 1800 in an example implementation for modification of color contrast ratio based on target contrast. Step 1802 receives input selecting a color set.

A user, for instance, selects a color set 118 for color contrast analysis via input to a contrast GUI 114, examples of which are detailed above.

Step 1804 converts the color set from a first color space to a second color space to generate a converted color set. For example, the converter module 202 converts the input color set from color values in a first color space (e.g., an RGB color space) into color values in a second color space, e.g., a CIE 1931 color space such as the CIE xyY color space. Step 1806 selects a first color of the converted color set as a background color and a second color of the converted color set as a foreground color. For instance, the selector module 206 specifies a first color of the converted color set as a background color and a second color of the converted color set as a foreground color. In at least one implementation, the selector module 206 automatically selects the background color and the foreground color such as based on an automated content analysis. For instance, the selector module 206 identifies foreground content as content that includes graphical content such as graphical components (e.g., shapes) and/or text content, and specifies a color of the foreground content as a foreground color and a color applied outside of the graphical content as a background color. In at least one implementation, a user specifies a particular color of the color set to be utilized as a background color and/or specifies a particular color to be utilized as a foreground color.

Step 1808 generates candidate color sets by modifying the background color and/or the foreground color to generate candidate color sets that exhibit a target contrast ratio. For example, a particular threshold minimum contrast ratio is specified and/or a set of target contrast ratio values is specified. In at least one implementation the threshold minimum contrast ratio and/or set of target contrast ratio values are based on contrast ratio values specified by the WCAG guidelines. The generator module 210 modifies the background color and/or the foreground color until the threshold minimum contrast ratio and/or set of target contrast ratios is achieved. In at least one implementation the generator module 210 adjusts lightness and/or darkness of the background color and/or the foreground color to achieve different contrast values, such as by increasing and/or decreasing luminance values of the colors. The candidate color sets, for example, each exhibit a different target contrast ratio.

Step 1810 converts the candidate color sets into the first color space to generate converted candidate color sets. For instance, the converter module 202 converts the candidate color sets from the second color space back into the first color space to generate the converted candidate color sets. Generally, this enables the converted candidate color sets to be utilized by display technology such as for display on the display device 124 of the computing device 102. Step 1812 transforms background content and/or foreground content by applying the converted candidate color sets to the background content and/or the foreground content. The applicator module 222, for example, applies converted candidate sets 216 to content 120 by applying the converted candidate sets 216 to the background 226 and/or the foreground content 228 to generate content candidates 224.

Figure 19:
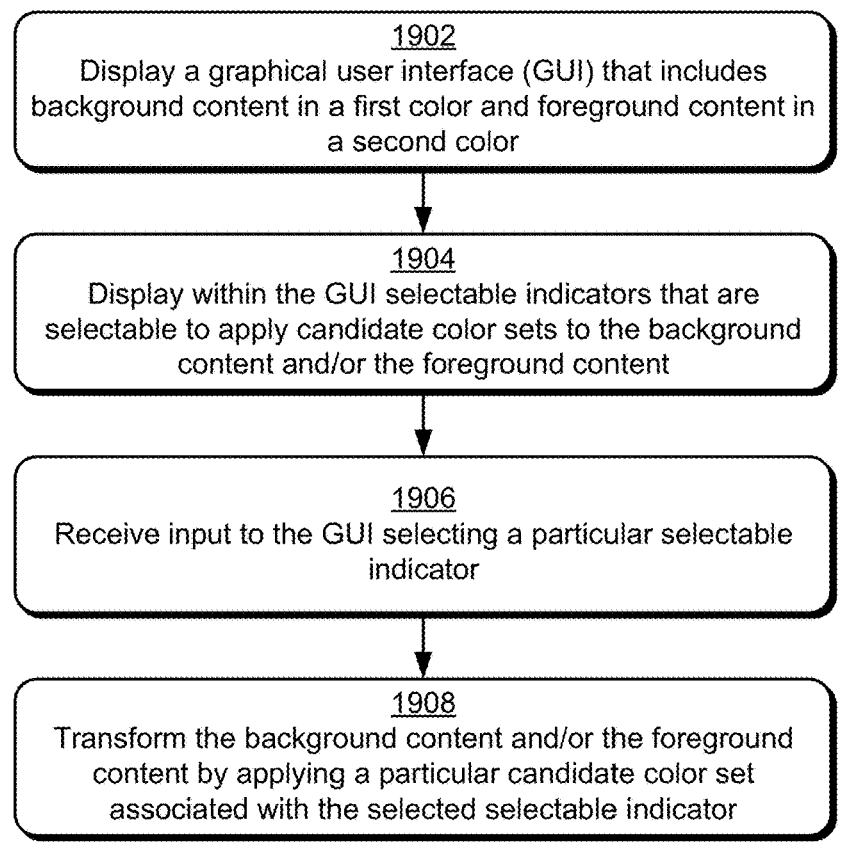
FIG. 19 depicts a procedure for utilizing a graphical user interface for implementing aspects of modification of color contrast ratio based on target contrast.

FIG. 19 depicts a procedure 1900 for utilizing a graphical user interface for implementing aspects of modification of color contrast ratio based on target contrast in accordance with one or more implementations. Step 1902 displays a graphical user interface (GUI) that includes background content in a first color and foreground content in a second color. The contrast module 112, for instance, displays a particular contrast GUI 114 that includes content with a particular color set 118 applied to a background and a foreground of the content. Examples of different contrast GUIs 114 are detailed above and in the accompanying figures.

Step 1904 displays within the GUI selectable indicators that are selectable to apply candidate color sets to the background content and/or the foreground content. For instance, the contrast module 112 positions selectable indicators within the GUI and optionally includes identifiers that specify contrast ratio values associated with respective candidate color sets for the selectable indicators. In at least one implementation that contrast module 112 displays within the GUI a contrast scale that includes multiple different contrast values in a sequential arrangement, such as depicted in the contrast GUIs 114 detailed above. In such implementations, the contrast module 112 positions the selectable indicators on the contrast scale based on contrast values for respective candidate color sets represented by the selectable indicators.

Step 1906 receives input to the GUI selecting a particular selectable indicator. The contrast module 112, for instance, detects user selection of a particular selectable indicator displayed in a contrast GUI 114. Step 1908 transforms the background content and/or the foreground content by applying a particular candidate color set associated with the selected selectable indicator to the background content and/or the foreground content. For example, the applicator module 222 applies a converted candidate set 216 associated with the selected selectable indicator to the background content and/or the foreground content to modify color attributes of the content, such as to achieve a target contrast ratio for the content.

Figure 20:
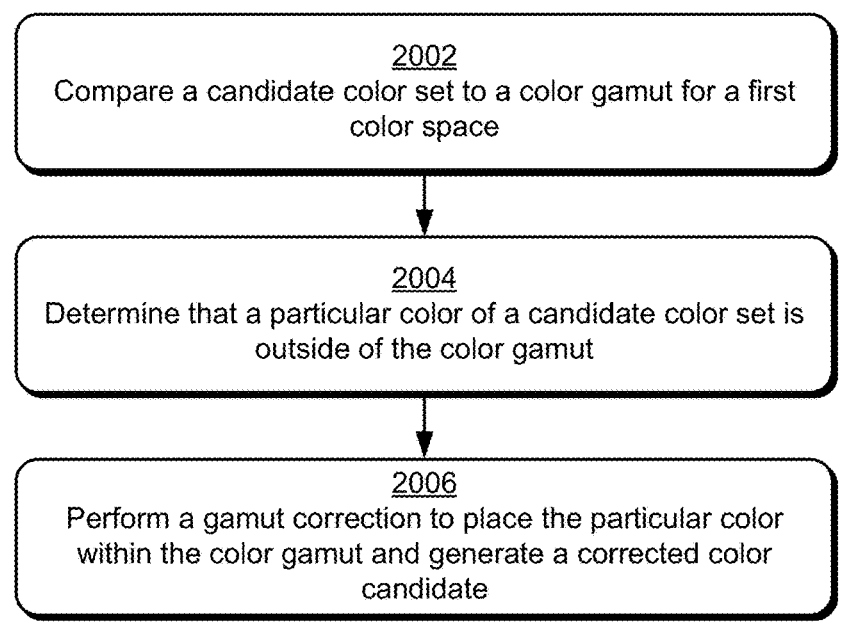
FIG. 20 depicts a procedure for performing a gamut correction as part of implementing aspects of modification of color contrast ratio based on target contrast.

FIG. 20 depicts a procedure 2000 for performing a gamut correction as part of implementing aspects of modification of color contrast ratio based on target contrast in accordance with one or more implementations. The procedure 2000, for instance, is performed in conjunction with the procedure 1800 to enable colors within the candidate color sets 212 to be positioned within a suitable color gamut for display. Step 2002 compares a candidate color set to a color gamut for a first color space. The gamut module 230, for instance, utilizes a representation of the first color space positioned relative to a second color space. In at least one implementation the first color space represents an RGB color space and the second color space represents a CIE 1931 color space. Consider, for example, FIG. 21a which depicts an example scenario 2100a for representing the first color space relative to the second color space. The scenario 2100a includes a CIE xyY color space 2102 including an axis 2104a that represents x values, an axis 2104b which represents y values, and an axis 2104c which represents Y values. The x and y values, for instance, represent color chromaticity values and the Y values represent luminance values. Positioned within the color space 2102 is a gamut representation 2106 of a second color space, e.g., an RGB color space. The gamut representation 2106, for instance, includes different RGB color values for an RGB color gamut positioned relative to their correspondence to corresponding CIE xyY values.

The scenario 2100a depicts a starting color 2108 which in at least one implementation represents a color from an input color set 118 to be modified to improve a contrast ratio of the color set 118. As illustrated, luminance values (Y values) of the starting color 2108 are able to be reduced to generate different modified colors while remaining within the gamut representation 2106 and thus within a color gamut of the first color space. For instance, a luminance value of the of the starting color 2108 is reduced to generate a candidate color 2110 that resides within the gamut representation 2106. Thus, in at least one implementation, comparing a candidate color set 212 to a color gamut for the first color space includes determining whether color values (e.g., a Y value) of a particular candidate color resides within values represented by the gamut representation 2106.

Step 2004 determines that a particular color of a candidate color set is outside of the color gamut. The gamut module 230, for instance, compares color values such as a Y value for colors of a candidate color set 212 and determines that a particular color value within the second color space resides outside of the gamut representation 2106 of the first color space. For instance, consider FIG. 21b which depicts a scenario 2100b in which the gamut representation 2106 of the first color space is depicted within the context of the second color space 2102, such as described above. In the scenario 2100b a luminance value of the starting color 2108 is increased to attempt to increase a contrast ratio of a candidate color set. Increasing the luminance value, however, causes color values (e.g., x and/or y values) of a resulting color within the second color space to be placed color position 2110 that resides outside of the gamut representation 2106, e.g., outside of the first color space.

Step 2006 performs a gamut correction to place the particular color within the color gamut and generates a corrected color candidate. The gamut module 230, for example, adjusts color values (e.g., x and/or y values) from the color position 2110 in the color space 2102 to generate a corrected color candidate 2114 that coincides with color values of the gamut representation 2106 of the first color space. The gamut module 230, for instance, projects a particular color represented by the color position 2110 from a position in the second color space outside of the gamut representation 2106 into a position within the gamut representation 2106 represented by the corrected color candidate 2114. Thus, the corrected color candidate 2114 is usable as part of a candidate color set 212, such as detailed above.

Figure 21A:
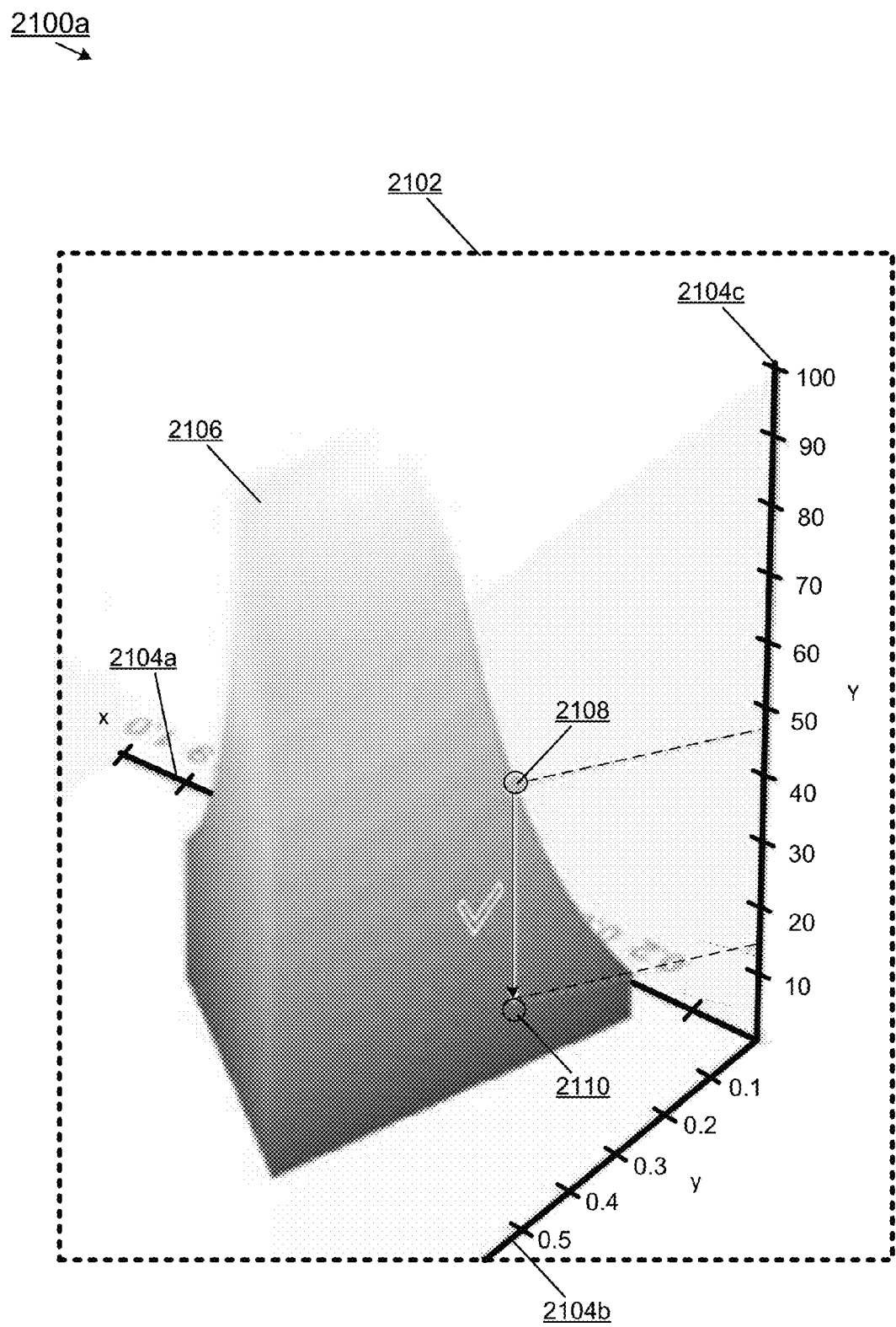
FIG. 21a depicts an example scenario for representing a first color space relative to a second color space.
Figure 21B:
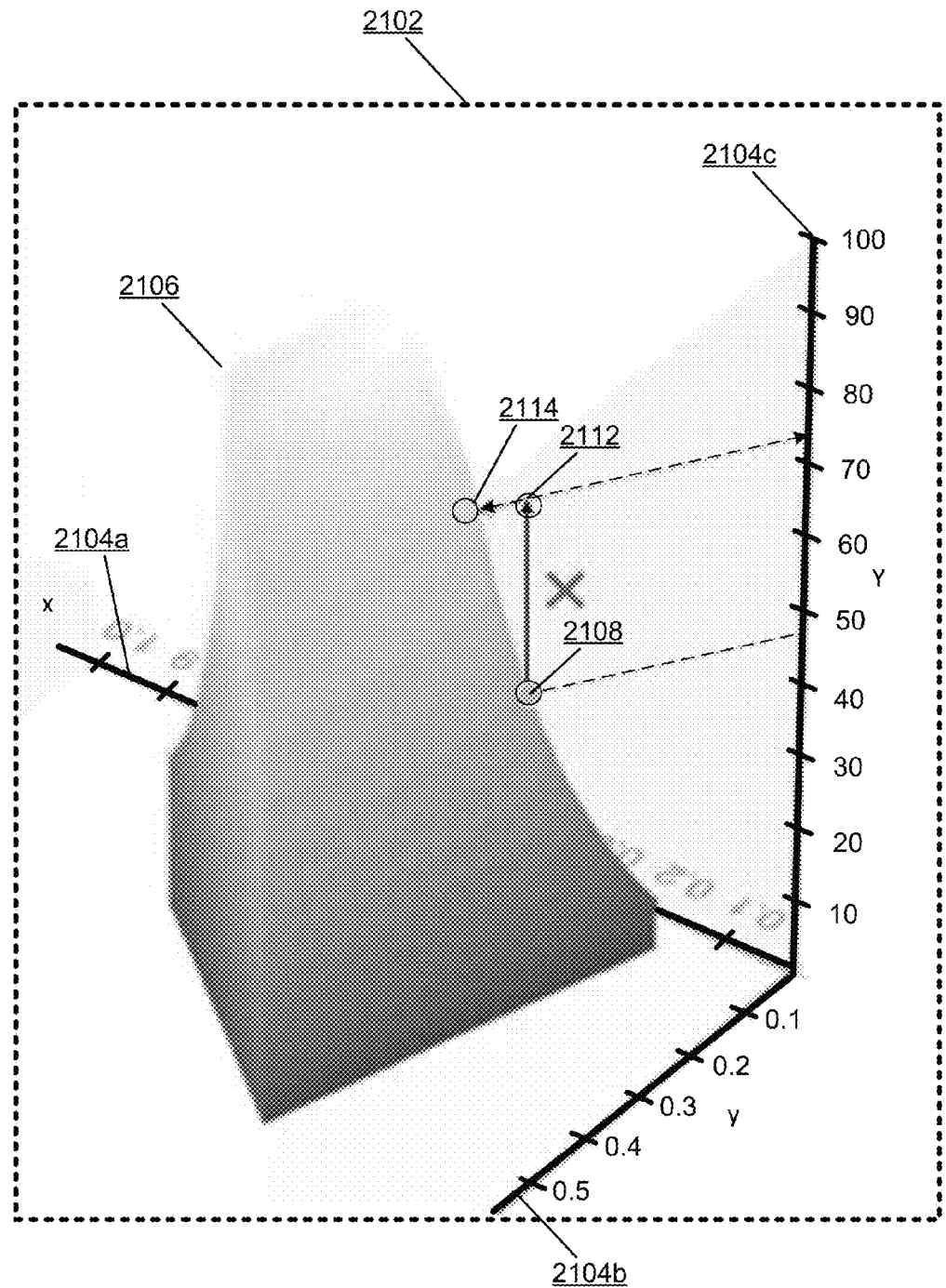
FIG. 21b depicts a scenario in which a gamut representation of a first color space is depicted within the context of a second color space.
Figure 21C:
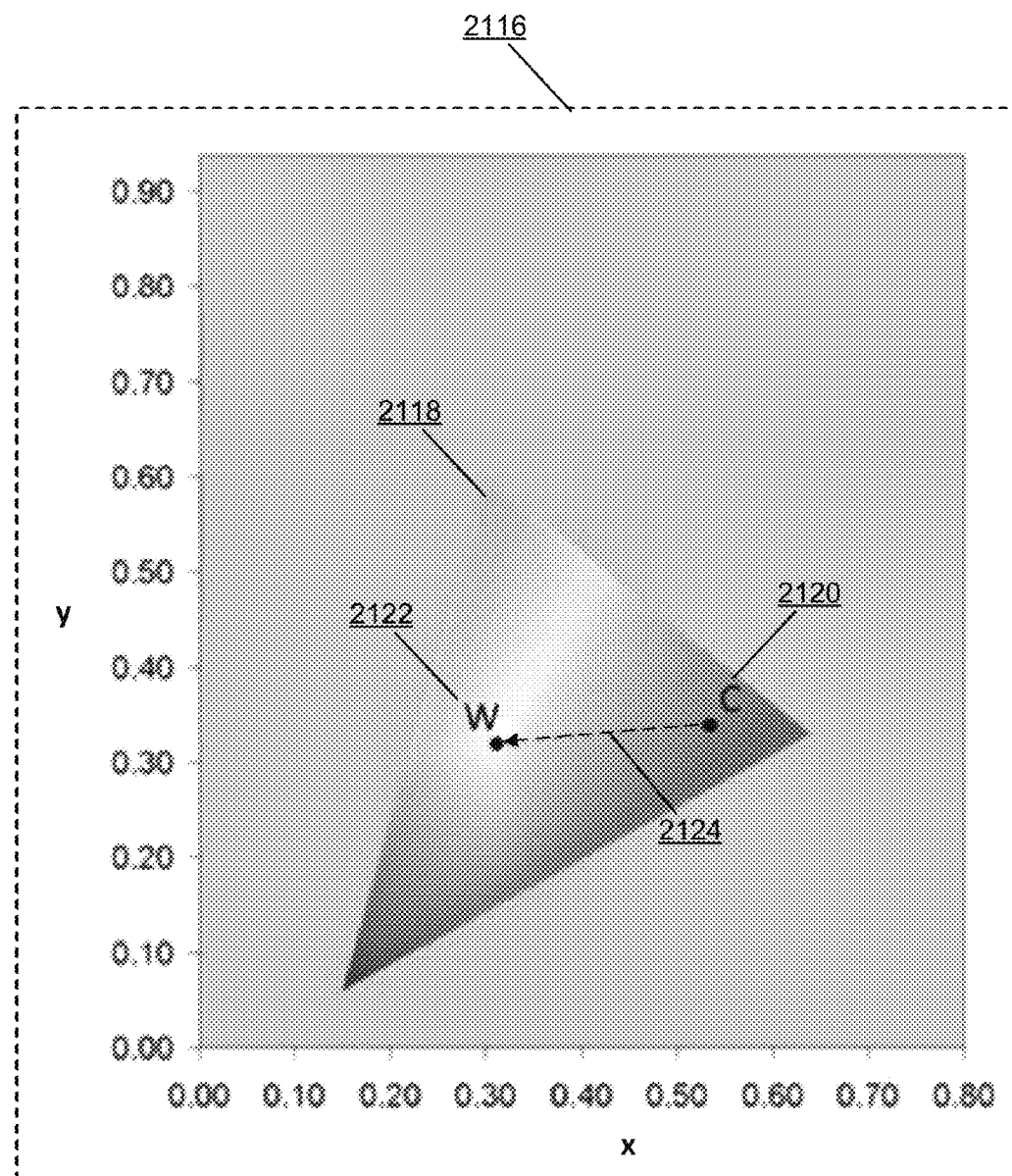
FIG. 21c depicts a scenario for adjusting color values of an out of gamut candidate to generate a corrected color candidate.

FIG. 21c depicts a scenario 2100c for adjusting color values of an out of gamut candidate to generate a corrected color candidate in accordance with one or more implementations. The scenario 2100c illustrates an x and y plane 2116 of the second color space 2102 and includes an overhead view 2118 (e.g., top down view) of the gamut representation 2106 placed within the second color space 2102. In the scenario 2100c a color candidate 2120 ("C") represents an out-of-gamut candidate, such as placed at the color position 2110 described above in the scenario 2100b. The color candidate 2120, for instance, is in a position above the gamut representation 2106 and thus is outside of the color gamut for the first color space.

Accordingly, to apply gamut correction to the color candidate 2120, color values of the color candidate 2120 are progressively modified toward a white point 2122 ("W") in the gamut representation 2106 until a resulting color overlaps with the gamut representation 2106. In at least one implementation this includes changing the perceived saturation of the color candidate 2120 by moving towards the white point 2122 (e.g., visualized per the sRGB specification) without affecting the Y value for the position 2110. For example, color values (e.g., x and/or y values) are progressively modified along a vector 2124 toward the white point 2122 until color values coincide with the gamut representation 2106. According to some example implementations the process performs multiple gamut checks at various points along the vector 2124 by converting a current color along the vector 2124 from the second color space to the first color space and checking whether color components are within a valid value range for the first color space (e.g., [0,1]) or if a color component is outside of the valid value range.

In at least one implementation to obtain a desired corrected color candidate that does not vary excessively from an original color (e.g., the starting color 2108) the gamut correction process computes a dot product between the original vector 2124 and each color point checked along the vector 2124. If the dot product=1, the resulting color exhibits color values within a desired range, e.g., has the same hue as the original color. If the dot product=−1, however, the color value is outside of the desired range, e.g., the hue has changed. In a scenario where a color value is outside of the desired range the color values (e.g., x and y values) are set to the values for the white point 2122 to generate a corrected color candidate.

Figure 21D:
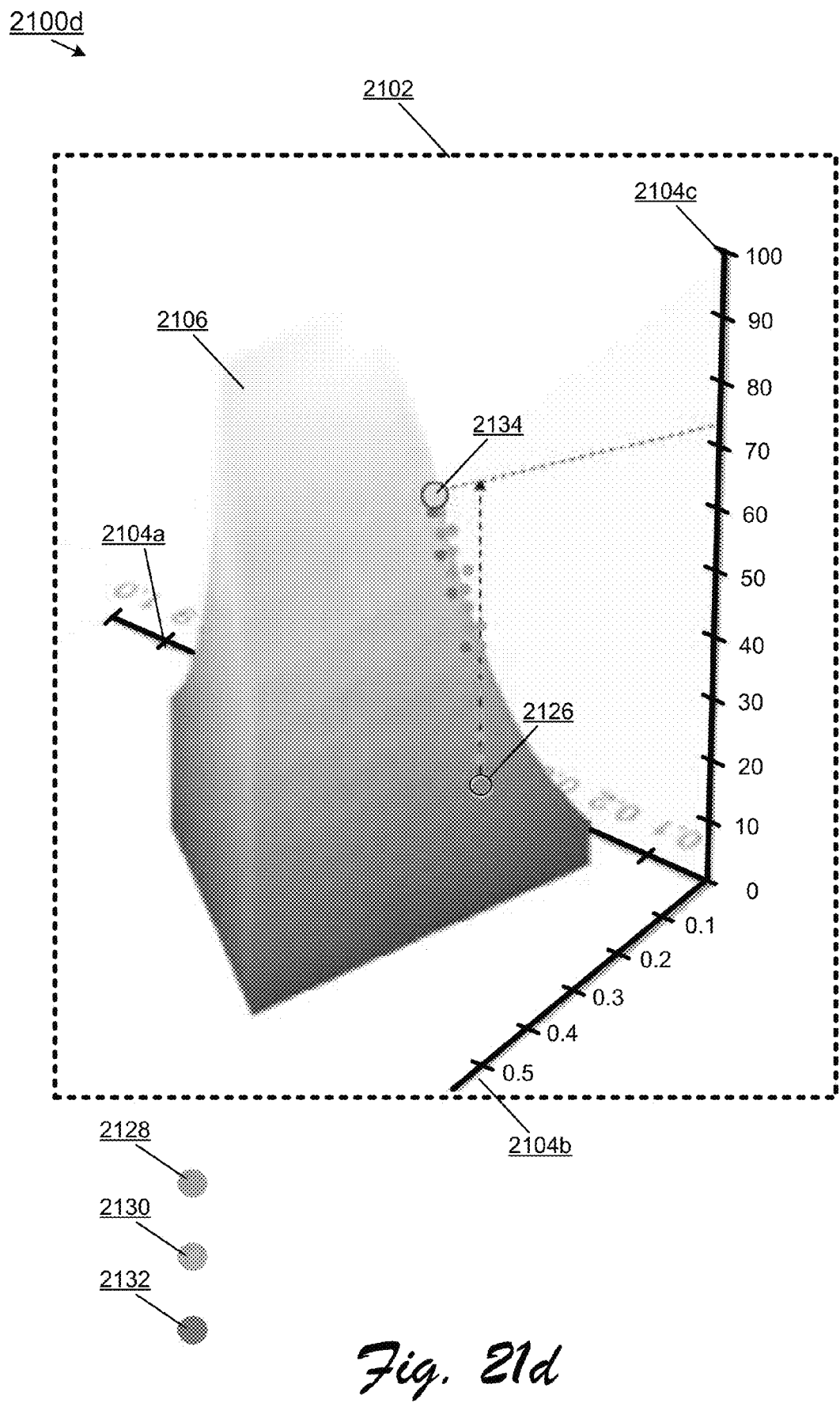
FIG. 21d depicts a scenario for incrementally adjusting color values of an out of gamut candidate to generate a corrected color candidate.

FIG. 21d depicts a scenario 2100d for incrementally adjusting color values of an out of gamut candidate to generate a corrected color candidate in accordance with one or more implementations. For instance, the scenario 2100d represents an example way for performing a gamut correction such as part of step 2006 of the procedure 2000. The scenario 2100d includes a starting color 2126 which in at least one implementation represents a color from an input color set 118 to be modified to improve a contrast ratio of the color set 118. To increase a contrast ratio of an associated color set, luminance values of the starting color 2126 are incrementally increased to generate different color candidates. Accordingly, the scenario 2100d illustrates in-gamut candidates 2128 (orange dots), out-of-gamut candidates 2130 (grey dots), adjusted candidates 2132 (pink dots), and a corrected candidate 2134.

Generally, the luminance values of the starting color 2126 are increased to generate the in-gamut candidates 2128 until an out-of-gamut candidate 2130 is detected, such as described above. In response to detecting an out-of-gamut candidate 2130, a gamut correction process is performed to adjust color values (e.g., x values, y values) to generate adjusted candidates 2132 that overlap with the gamut representation 2106. This process is performed by incrementally adjusting luminance values and adjusting color values until the corrected candidate 2134 is generated. In at least one implementation, the corrected candidate 2134 corresponds to a color set with a target contrast ratio. For instance, the in-gamut candidates 2128 and the adjusted candidates 2132 do not correspond to a pre-specified target contrast ratio. However, in at least one implementation, color sets that include the in-gamut candidates 2128 and the adjusted candidates 2132 are presented to a user for selection for modifying an input color set. For instance, selectable indicators that represent color sets that include the in-gamut candidates 2128 and/or the adjusted candidates 2132 are presented in a contrast GUI 114 for user selection to modify an input color set. Thus, as part of a gamut correction process, multiple incremental gamut corrections are performed to generate multiple different corrected color candidates that overlap with the color gamut.

In conclusion, techniques for modification of color contrast ratio based on target contrast enable target contrast ratios to be achieved while maintaining fidelity to an original input color set, which is not possible using convention techniques.

Example System and Device

Figure 22:
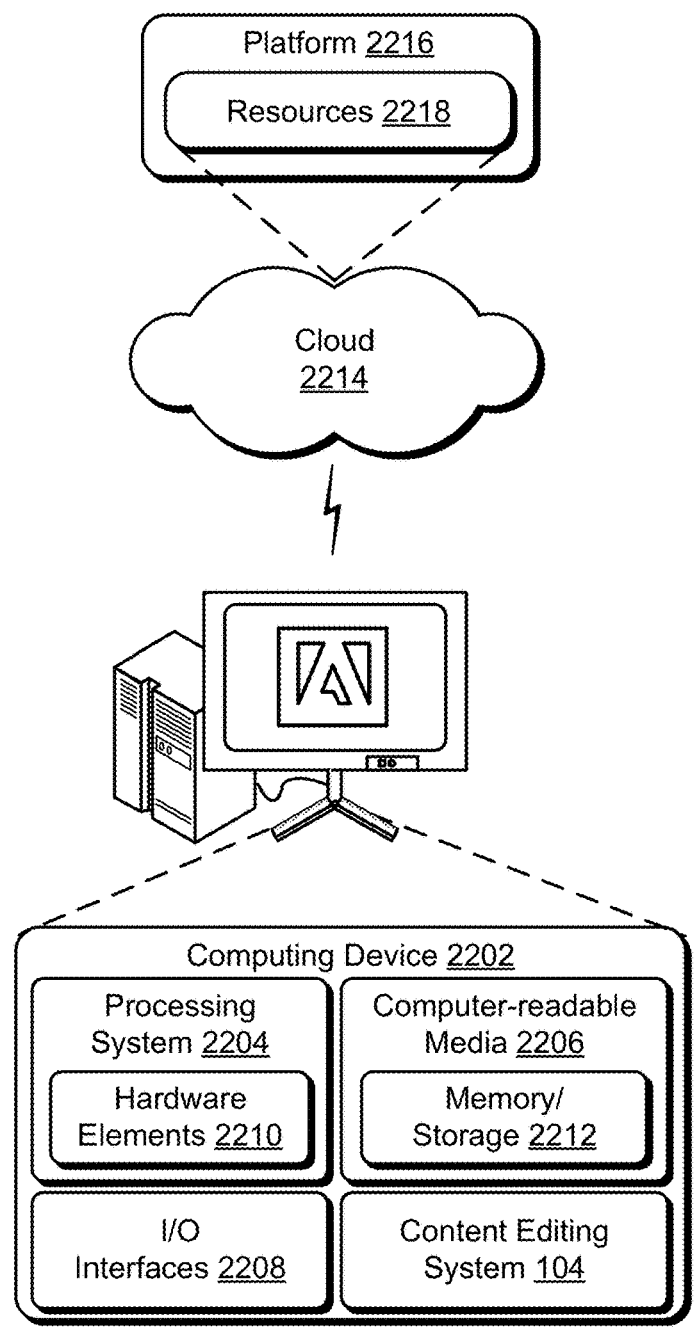
FIG. 22 illustrates an example system including various components of an example device that is implementable as any type of computing device as described and/or utilized with reference to FIGS. 1-21d to perform implementations of techniques described herein.

FIG. 22 illustrates an example system generally at 2200 that includes an example computing device 2202 that is representative of one or more computing systems and/or devices that implement the various techniques described herein, and represents an example implementation of the computing device 102. This is demonstrated via inclusion of the content editing system 104. The computing device 2202, for example, represents a server of a service provider, a device associated with a client (e.g., a client device), an on-chip system, and/or any other suitable computing device or computing system.

The example computing device 2202 as illustrated includes a processing system 2204, one or more computer-readable media 2206, and one or more I/O interfaces 2208 that are communicatively coupled, one to another. Although not shown, the computing device 2202 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2204 is representative of functionality to perform one or more operations using hardware. Accordingly, the processing system 2204 is illustrated as including hardware elements 2210 that are be configured as processors, functional blocks, and so forth. This includes example implementations in hardware as an application specific integrated circuit or other logic device formed using one or more semiconductors. The hardware elements 2210 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 2206 is illustrated as including memory/storage 2212. The memory/storage 2212 represents memory/storage capacity associated with one or more computer-readable media. In one example, the memory/storage component 2212 includes volatile media (such as random access memory (RAM)) and/or nonvolatile media (such as read only memory (ROM), Flash memory, optical disks, magnetic disks, and so forth). In another example, the memory/storage component 2212 includes fixed media (e.g., RAM, ROM, a fixed hard drive, and so on) as well as removable media (e.g., Flash memory, a removable hard drive, an optical disc, and so forth). The computer-readable media 2206 is configurable in a variety of other ways as further described below.

Input/output interface(s) 2208 are representative of functionality to allow a user to enter commands and information to computing device 2202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 2202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 2202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2210 and computer-readable media 2206 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 2210. For example, the computing device 2202 is configured to implement particular instructions and/or functions corresponding to the software and/or hardware modules. Accordingly, implementation of a module that is executable by the computing device 2202 as software is achieved at least partially in hardware, e.g., through use of computer-readable storage media and/or hardware elements 2210 of the processing system 2204. The instructions and/or functions are executable/operable by one or more articles of manufacture (for example, one or more computing devices 2202 and/or processing systems 2204) to implement techniques, modules, and examples described herein.

The techniques described herein are supportable by various configurations of the computing device 2202 and are not limited to the specific examples of the techniques described herein. This functionality is also implementable entirely or partially through use of a distributed system, such as over a "cloud" 2214 as described below.

The cloud 2214 includes and/or is representative of a platform 2216 for resources 2218. The platform 2216 abstracts underlying functionality of hardware (e.g., servers) and software resources of the cloud 2214. For example, the resources 2218 include applications and/or data that are utilized while computer processing is executed on servers that are remote from the computing device 2202. In some examples, the resources 2218 also include services provided over the Internet and/or through a subscriber network, such as a cellular or Wi-Fi network.

The platform 2216 abstracts the resources 2218 and functions to connect the computing device 2202 with other computing devices. In some examples, the platform 2216 also serves to abstract scaling of resources to provide a corresponding level of scale to encountered demand for the resources that are implemented via the platform. Accordingly, in an interconnected device embodiment, implementation of functionality described herein is distributable throughout the system 2200. For example, the functionality is implementable in part on the computing device 2202 as well as via the platform 2216 that abstracts the functionality of the cloud 2214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method implemented by at least one processing device for generating a modified contrast ratio for a color set, the method comprising:
converting, by the at least one processing device, a color set from a first color space to a second color space to generate a converted color set;
identifying, by the at least one processing device, foreground content and background content in digital content;
selecting, by the at least one processing device, a first color of the converted color set as a background color and a second color of the converted color set as a foreground color;
generating, by the at least one processing device, one or more candidate color sets by modifying one or more of the background color or the foreground color to generate one or more candidate color sets within a target contrast ratio range by modifying a luminance of one or more of the background color or the foreground color until a contrast ratio of the background color and the foreground color is within the target contrast ratio range;
converting, by the at least one processing device, the one or more candidate color sets into the first color space to generate one or more converted candidate color sets; and
applying, by the at least one processing device, the one or more converted candidate color sets to the foreground content or the background content in the digital content.

2. A method implemented as described in claim 1, wherein said converting comprises converting, by the at least one processing device, the color set from an RGB color space to a CIE xyY color space.

3. A method implemented as described in claim 1, wherein said selecting a first color of the converted color set as a background color and a second color of the converted color set as a foreground color comprises, for a set of content, distinguishing foreground content from background content and selecting a color of the background content as the background color and a color of the foreground content as the foreground color.

4. A method implemented as described in claim 1, wherein said generating the one or more candidate color sets comprises generating, by the at least one processing device, multiple candidate color sets that each exhibit a different target contrast ratio.

5. A method implemented as described in claim 1, further comprising comparing the one or more candidate color sets to a color gamut for the first color space, determining that a particular color of the one or more candidate color sets is outside of the color gamut, and performing a gamut correction to place the particular color within the color gamut and generate a corrected color candidate.

6. A method implemented as described in claim 5, wherein said performing a gamut correction comprises implementing a representation of the first color space within the second color space, and projecting the particular color from a position in the second color space outside of the representation of the first color space into a position within the representation of the first color space.

7. A method implemented as described in claim 5, wherein said performing a gamut correction comprises adjusting one or more chromaticity values of the particular color until the corrected color candidate overlaps with the color gamut of the first color space.

8. A method implemented as described in claim 1, further comprising:
displaying, by the at least one processing device, a graphical user interface (GUI) that includes background content in the background color and foreground content in the foreground color, and one or more selectable indicators that represent the one or more converted candidate color sets;

receiving, by the at least one processing device, input to select a particular selectable indicator of the one or more selectable indicators; and transforming, by the at least one processing device, one or more of the background content or the foreground content by applying a particular converted candidate color set represented by the particular selectable indicator to one or more of the background content or the foreground content.

9. A method implemented as described in claim 8, wherein said selecting a first color of the converted color set as a background color and a second color of the converted color set as a foreground color comprises receiving user input to the GUI to select the background content as the background color and to select the foreground content as the foreground color.

10. A system comprising:
a memory component; and
a processing device coupled to the memory component, the processing device configured to:
convert a color set from a first color space to a second color space to generate a converted color set;
identify foreground content and background content in digital content;
select a first color of the converted color set as a background color and a second color of the converted color set as a foreground color;
modify one or more of the background color or the foreground color to generate one or more candidate color sets within a target contrast ratio range by modifying a luminance of one or more of the background color or the foreground color until a contrast ratio of the background color and the foreground color is within the target contrast ratio range;
compare the one or more candidate color sets to a color gamut for the first color space, determine that a particular color of the one or more candidate color sets is outside of the color gamut, and perform a gamut correction to place the particular color within the color gamut and generate a corrected color candidate;
convert the one or more candidate color sets including the corrected color candidate into the first color space to generate one or more converted candidate color sets; and
apply the one or more converted candidate color sets to the foreground content or the background content in the digital content.

11. A method implemented as described in claim 8, further comprising generating, by the at least one processing device, a contrast rating that indicates whether the contrast ratio has achieved an acceptable contrast rating.

12. A system as described in claim 10, wherein the processing device is further configured to display a graphical user interface (GUI) that includes background content and foreground content, and select a first color of the converted color set as a background color and a second color of the converted color set as a foreground color based on user input to the GUI to designate the background content for the background color and the foreground content for the foreground color.

13. A system as described in claim 12, wherein the processing device is further configured to implement a representation of the first color space within a context of the second color space, and perform the gamut correction by projecting the particular color from a position in the second color space outside of the representation of the first color space into a position within the representation of the first color space.

14. A system as described in claim 12, wherein to perform the gamut correction includes to perform multiple incremental gamut corrections to generate multiple different corrected color candidates that overlap with the color gamut, and wherein the processing device is further configured to convert the multiple different corrected color candidates into different respective converted color candidate sets.

15. A system as described in claim 14, wherein the processing device is further configured to display a graphical user interface (GUI) that includes selectable indicators that represent the converted color candidate sets, wherein individual selectable indicators are selectable to apply respective converted color candidate sets to content displayed in the GUI.

16. One or more computer-readable storage media having instructions stored that, responsive to execution by a processing device, causes the processing device to perform operations comprising:
identifying foreground content and background content in digital content;
generating one or more candidate color sets based on an input color set by modifying one or more of a background color or a foreground color to generate one or more candidate color sets within a target contrast ratio range by modifying a luminance of one or more of the background color or the foreground color until a contrast ratio of the background color and the foreground color is within the target contrast ratio range;
displaying a graphical user interface (GUI) that includes the background content in the background color and the foreground content in the foreground color, and one or more selectable indicators that are selectable to apply the one or more candidate color sets to one or more of the background content or the foreground content, the one or more selectable indicators identifying a contrast ratio value associated with a respective candidate color set;
receiving input to the GUI selecting a particular selectable indicator of the one or more selectable indicators; and
transforming one or more of the background content or the foreground content by applying a particular candidate color set associated with the selected selectable indicator to the one or more of the background content or the foreground content.

17. One or more computer-readable storage media of claim 16, wherein the operations further comprise receiving user input to the GUI to select the background content to designate as the background color, and to select the foreground content to designate as the foreground color.

18. One or more computer-readable storage media of claim 16, wherein a first selectable indicator of the one or more selectable indicators is selectable to apply a candidate color set to modify a color of the background content, and a second selectable indicator of the one or more selectable indicators is selectable to apply a candidate color set to modify a color of the foreground content.

19. One or more computer-readable storage media of claim 16, wherein the operations further comprise:
displaying within the GUI a contrast scale that includes multiple different contrast values in a sequential arrangement; and
positioning the one or more selectable indicators on the contrast scale based on one or more contrast values for one or more candidate color sets represented by the one or more selectable indicators.

20. One or more computer-readable storage media of claim 19, wherein the contrast scale includes a first area and a second area, and wherein a first selectable indicator of the one or more selectable indicators is positioned within the first area to enable a first candidate color set that includes a lighter color than the input color set to be selected, and a second selectable indicator of the one or more selectable indicators is positioned within the second area to enable a second candidate color set that includes a darker color than the input color set to be selected.

* * * * *

UNITED STATES PATENT AND TRADEMARK OFFICE
CERTIFICATE OF CORRECTION

PATENT NO. : 11,651,530 B2
APPLICATION NO. : 17/354611
DATED : May 16, 2023
INVENTOR(S) : Jose Ignacio Echevarria Vallespi, Manisha Gupta and Bernard James Kerr It is certified that error appears in the above-identified patent and that said Letters Patent is hereby corrected as shown below:

In the Claims

Replace Column 21, Line 60-Column 25, Line 12, (approx.) with the following:
1. A method implemented by at least one processing device for generating a modified contrast ratio for a color set, the method comprising:
    converting, by the at least one processing device, a color set from a first color space to a second color space to generate a converted color set;
    identifying, by the at least one processing device, foreground content and background content in digital content;
    selecting, by the at least one processing device, a first color of the converted color set as a background color and a second color of the converted color set as a foreground color;
    generating, by the at least one processing device, one or more candidate color sets by modifying one or more of the background color or the foreground color to generate one or more candidate color sets within a target contrast ratio range by modifying a luminance of one or more of the background color or the foreground color until a contrast ratio of the background color and the foreground color is within the target contrast ratio range;
    converting, by the at least one processing device, the one or more candidate color sets into the first color space to generate one or more converted candidate color sets; and
    applying, by the at least one processing device, the one or more converted candidate color sets to the foreground content or the background content in the digital content.

2. A method implemented as described in claim 1, wherein said converting comprises converting, by the at least one processing device, the color set from an RGB color space to a CIE xyY color space.

3. A method implemented as described in claim 1, wherein said selecting a first color of the converted color set as a background color and a second color of the converted color set as a foreground color comprises, for a set of content, distinguishing foreground content from background content and selecting a color of the background content as the Signed and Sealed this
Fifth Day of September, 2023

Katherine Kelly Vidal
*Director of the United States Patent and Trademark Office* background color and a color of the foreground content as the foreground color.

4. A method implemented as described in claim 1, wherein said generating the one or more candidate color sets comprises generating, by the at least one processing device, multiple candidate color sets that each exhibit a different target contrast ratio.

5. A method implemented as described in claim 1, further comprising comparing the one or more candidate color sets to a color gamut for the first color space, determining that a particular color of the one or more candidate color sets is outside of the color gamut, and performing a gamut correction to place the particular color within the color gamut and generate a corrected color candidate.

6. A method implemented as described in claim 5, wherein said performing a gamut correction comprises implementing a representation of the first color space within the second color space, and projecting the particular color from a position in the second color space outside of the representation of the first color space into a position within the representation of the first color space.

7. A method implemented as described in claim 5, wherein said performing a gamut correction comprises adjusting one or more chromaticity values of the particular color until the corrected color candidate overlaps with the color gamut of the first color space.

8. A method implemented as described in claim 1, further comprising:
    displaying, by the at least one processing device, a graphical user interface (GUI) that includes background content in the background color and foreground content in the foreground color, and one or more selectable indicators that represent the one or more converted candidate color sets;
    receiving, by the at least one processing device, input to select a particular selectable indicator of the one or more selectable indicators; and
    transforming, by the at least one processing device, one or more of the background content or the foreground content by applying a particular converted candidate color set represented by the particular selectable indicator to one or more of the background content or the foreground content.

9. A method implemented as described in claim 8, wherein said selecting a first color of the converted color set as a background color and a second color of the converted color set as a foreground color comprises receiving user input to the GUI to select the background content as the background color and to select the foreground content as the foreground color.

10. A method implemented as described in claim 8, further comprising generating, by the at least one processing device, a contrast rating that indicates whether the contrast ratio has achieved an acceptable contrast rating.

11. A system comprising:

a memory component; and a processing device coupled to the memory component, the processing device configured to:

convert a color set from a first color space to a second color space to generate a converted color set;

identify foreground content and background content in digital content;

select a first color of the converted color set as a background color and a second color of the converted color set as a foreground color;

modify one or more of the background color or the foreground color to generate one or more candidate color sets within a target contrast ratio range by modifying a luminance of one or more of the background color or the foreground color until a contrast ratio of the background color and the foreground color is within the target contrast ratio range;

compare the one or more candidate color sets to a color gamut for the first color space, determine that a particular color of the one or more candidate color sets is outside of the color gamut, and perform a gamut correction to place the particular color within the color gamut and generate a corrected color candidate;

convert the one or more candidate color sets including the corrected color candidate into the first color space to generate one or more converted candidate color sets; and apply the one or more converted candidate color sets to the foreground content or the background content in the digital content.

12. A system as described in claim 11, wherein the processing device is further configured to display a graphical user interface (GUI) that includes background content and foreground content, and select a first color of the converted color set as a background color and a second color of the converted color set as a foreground color based on user input to the GUI to designate the background content for the background color and the foreground content for the foreground color.

13. A system as described in claim 11, wherein the processing device is further configured to implement a representation of the first color space within a context of the second color space, and perform the gamut correction by projecting the particular color from a position in the second color space outside of the representation of the first color space into a position within the representation of the first color space.

14. A system as described in claim 11, wherein to perform the gamut correction includes to perform multiple incremental gamut corrections to generate multiple different corrected color candidates that overlap with the color gamut, and wherein the processing device is further configured to convert the multiple different corrected color candidates into different respective converted color candidate sets.

15. A system as described in claim 14, wherein the processing device is further configured to display a graphical user interface (GUI) that includes selectable indicators that represent the converted color candidate sets, wherein individual selectable indicators are selectable to apply respective converted color candidate sets to content displayed in the GUI.

16. One or more computer-readable storage media having instructions stored that, responsive to execution by a processing device, causes the processing device to perform operations comprising:
    identifying foreground content and background content in digital content;
    generating one or more candidate color sets based on an input color set by modifying one or more of a background color or a foreground color to generate one or more candidate color sets within a target contrast ratio range by modifying a luminance of one or more of the background color or the foreground color until a contrast ratio of the background color and the foreground color is within the target contrast ratio range;
    displaying a graphical user interface (GUI) that includes the background content in the background color and the foreground content in the foreground color, and one or more selectable indicators that are selectable to apply the one or more candidate color sets to one or more of the background content or the foreground content, the one or more selectable indicators identifying a contrast ratio value associated with a respective candidate color set;
    receiving input to the GUI selecting a particular selectable indicator of the one or more selectable indicators; and
    transforming one or more of the background content or the foreground content by applying a particular candidate color set associated with the selected selectable indicator to the one or more of the background content or the foreground content.

17. One or more computer-readable storage media of claim 16, wherein the operations further comprise receiving user input to the GUI to select the background content to designate as the background color, and to select the foreground content to designate as the foreground color.

18. One or more computer-readable storage media of claim 16, wherein a first selectable indicator of the one or more selectable indicators is selectable to apply a candidate color set to modify a color of the background content, and a second selectable indicator of the one or more selectable indicators is selectable to apply a candidate color set to modify a color of the foreground content.

19. One or more computer-readable storage media of claim 16, wherein the operations further comprise:
    displaying within the GUI a contrast scale that includes multiple different contrast values in a sequential arrangement; and
    positioning the one or more selectable indicators on the contrast scale based on one or more contrast values for one or more candidate color sets represented by the one or more selectable indicators.

20. One or more computer-readable storage media of claim 19, wherein the contrast scale includes a first area and a second area, and wherein a first selectable indicator of the one or more selectable indicators is positioned within the first area to enable a first candidate color set that includes a lighter color than the input color set to be selected, and a second selectable indicator of the one or more selectable indicators is positioned within the second area to enable a second candidate color set that includes a darker color than the input color set to be selected.